United States Patent [19]
Schmidt

[11] Patent Number: 5,862,681
[45] Date of Patent: Jan. 26, 1999

[54] PILE FABRIC METHODS AND CIRCULAR KNITTING MACHINES WITH IMPROVED PILE ELEMENTS FOR MANUFACTURING AFORESAID

[75] Inventor: Walter R. Schmidt, Krems, Austria

[73] Assignee: TMG Stefalex Handels AG, Zug, Switzerland

[21] Appl. No.: 779,074

[22] Filed: Jan. 8, 1997

[51] Int. Cl.[6] .............................. D04B 1/02; D04B 9/12
[52] U.S. Cl. ................... 66/9 R; 66/95; 66/106; 66/107
[58] Field of Search .............................. 66/9 R, 106, 107, 66/8, 15, 20, 25, 95

[56] References Cited

U.S. PATENT DOCUMENTS

| | | | |
|---|---|---|---|
| 4,612,784 | 9/1986 | Plath | 66/9 R |
| 4,989,421 | 2/1991 | Schmidt | 66/9 R |
| 5,167,133 | 12/1992 | Schmidt | 66/9 R |
| 5,186,025 | 2/1993 | Neher | 66/9 R |
| 5,713,220 | 2/1998 | Seino et al. | 66/9 R X |

FOREIGN PATENT DOCUMENTS

| | | | |
|---|---|---|---|
| 1074783 | 10/1954 | France | 66/107 |
| 2060716 | 5/1981 | United Kingdom | 66/107 |

*Primary Examiner*—John J. Calvert
*Attorney, Agent, or Firm*—Pillsbury Madison & Sutro, LLP

[57] ABSTRACT

The present invention relates to improved pile fabrics containing courses in which at least two pile forming yarns are meshed across a complete course together cooperatively in various fabric constructions, and respectively into a ground fabric, and forming pile loops one another alternatively in succeeding wales or areas. The fabric is manufactured according to a process in which needles are moved into a feeding position in which they remain, meanwhile in at least two succeeding sections, alternatively, pile elements are selected and raised and after the feeding of a pile yarn are retracted to an intermediate position. The pile yarns are controlled separately from one another and are unaffected in their movement to the loop-forming and meshing action. The manufacturing is realized on circular knitting machinery having a plurality of knitting sections of a type having at least two cooperative beds adapted for movable disposition therein of respective circles of knitting needles and arranged for respective movement of knitting needles transversely of and between a circle of pile elements arranged in the other bed for respective movement of the pile elements each having a pile yarn engaging hook. The pile loops can be severed according to an arrangement provided for in the knitting machine.

20 Claims, 34 Drawing Sheets

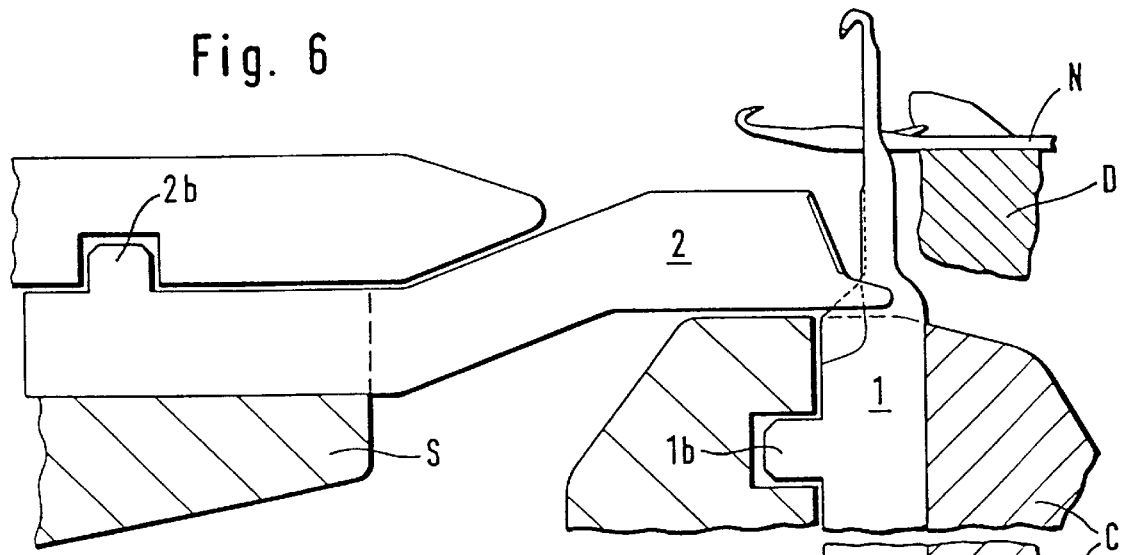
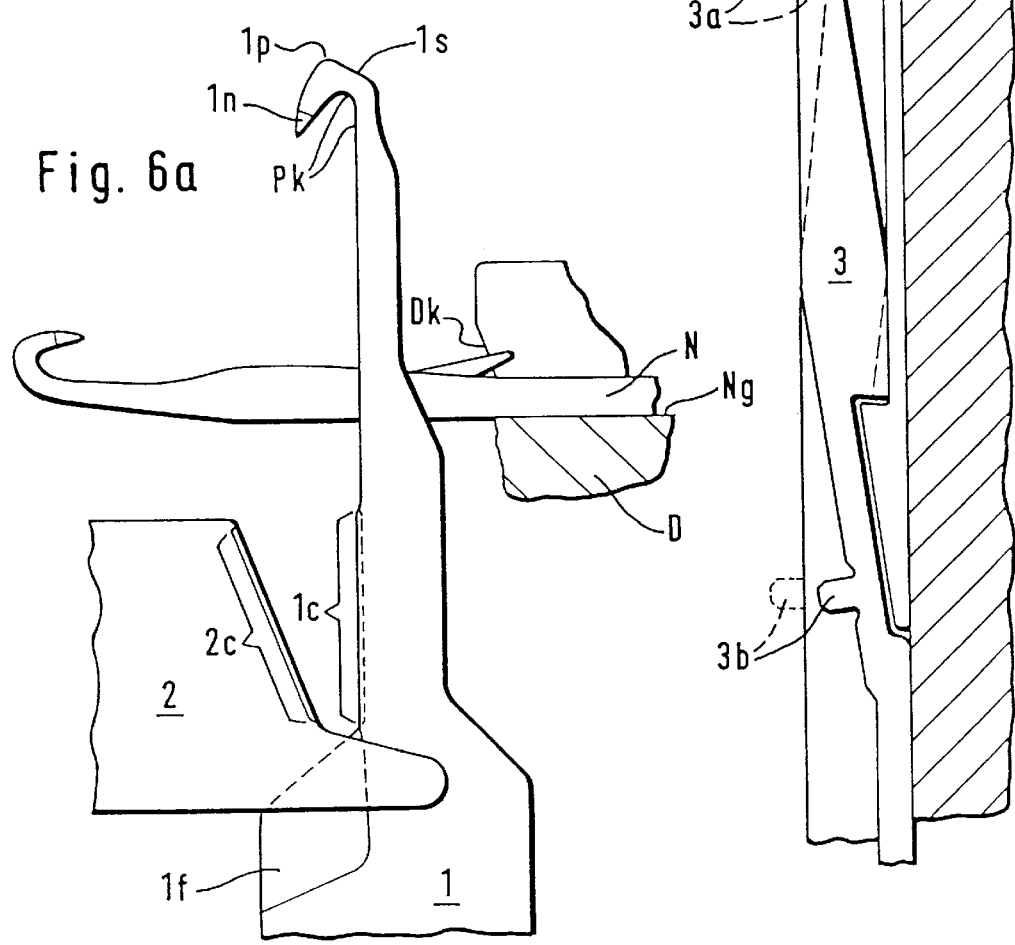
Fig. 6
Fig. 6a

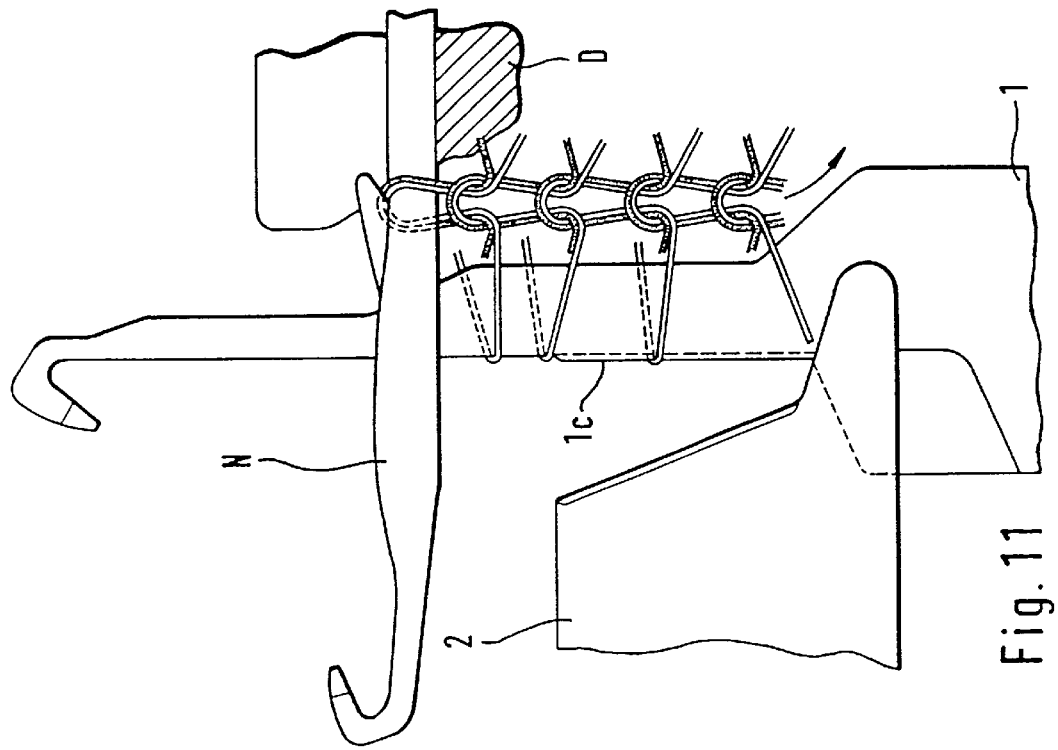
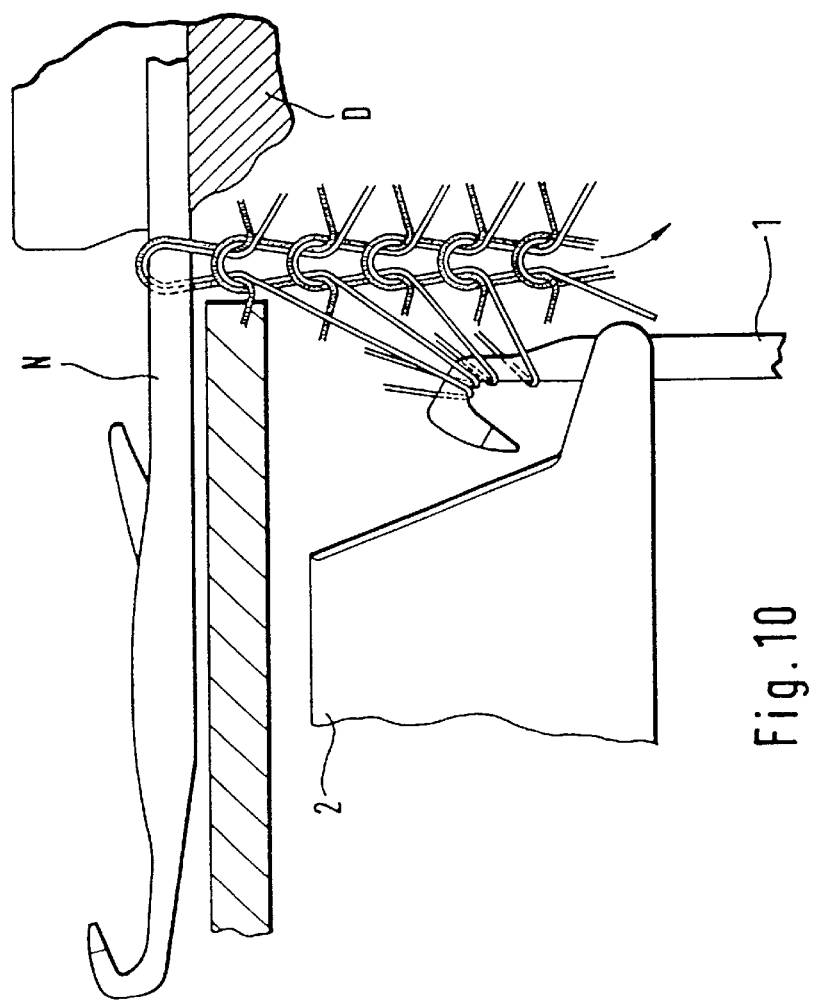
Fig. 11
Fig. 10

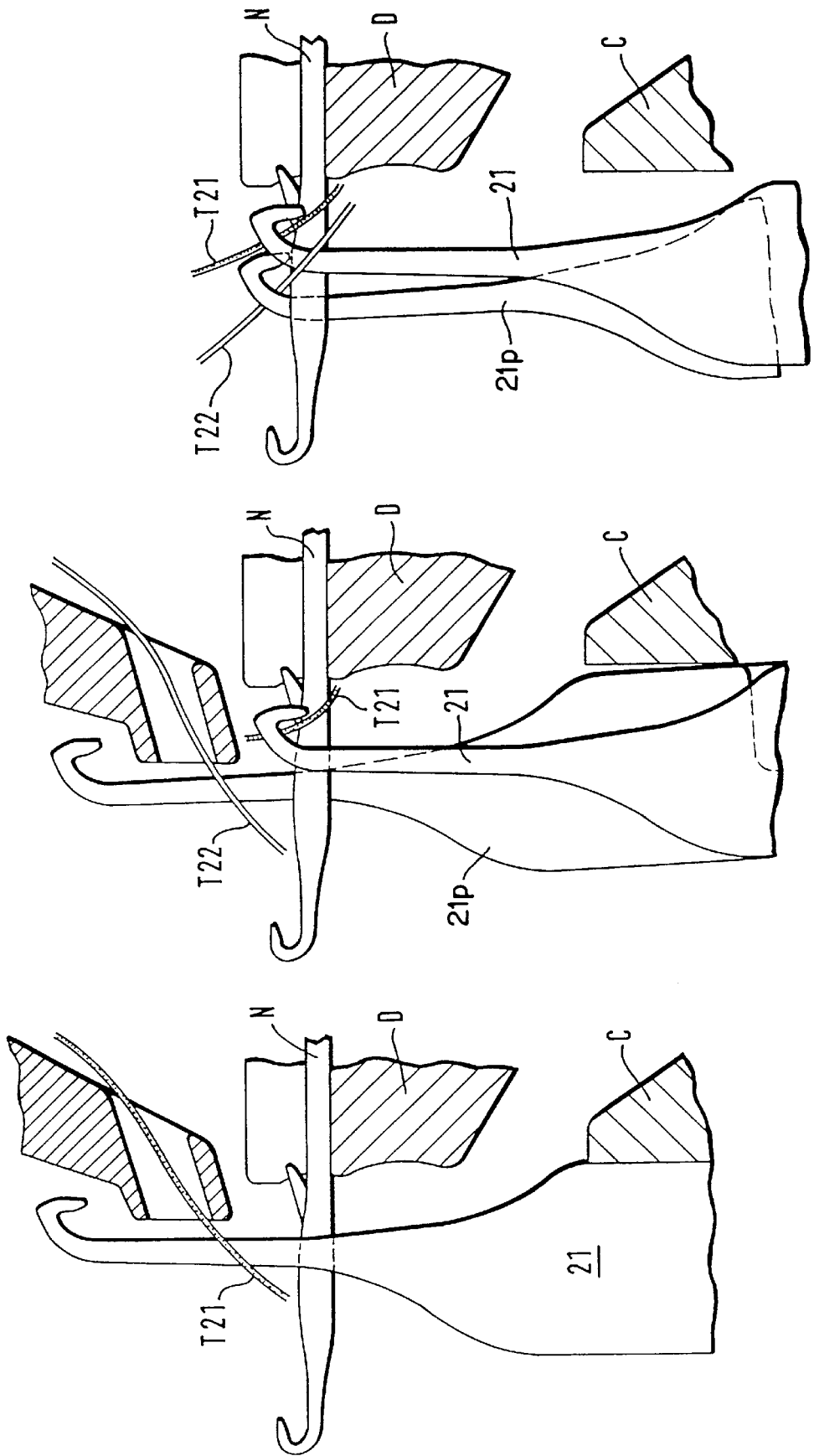

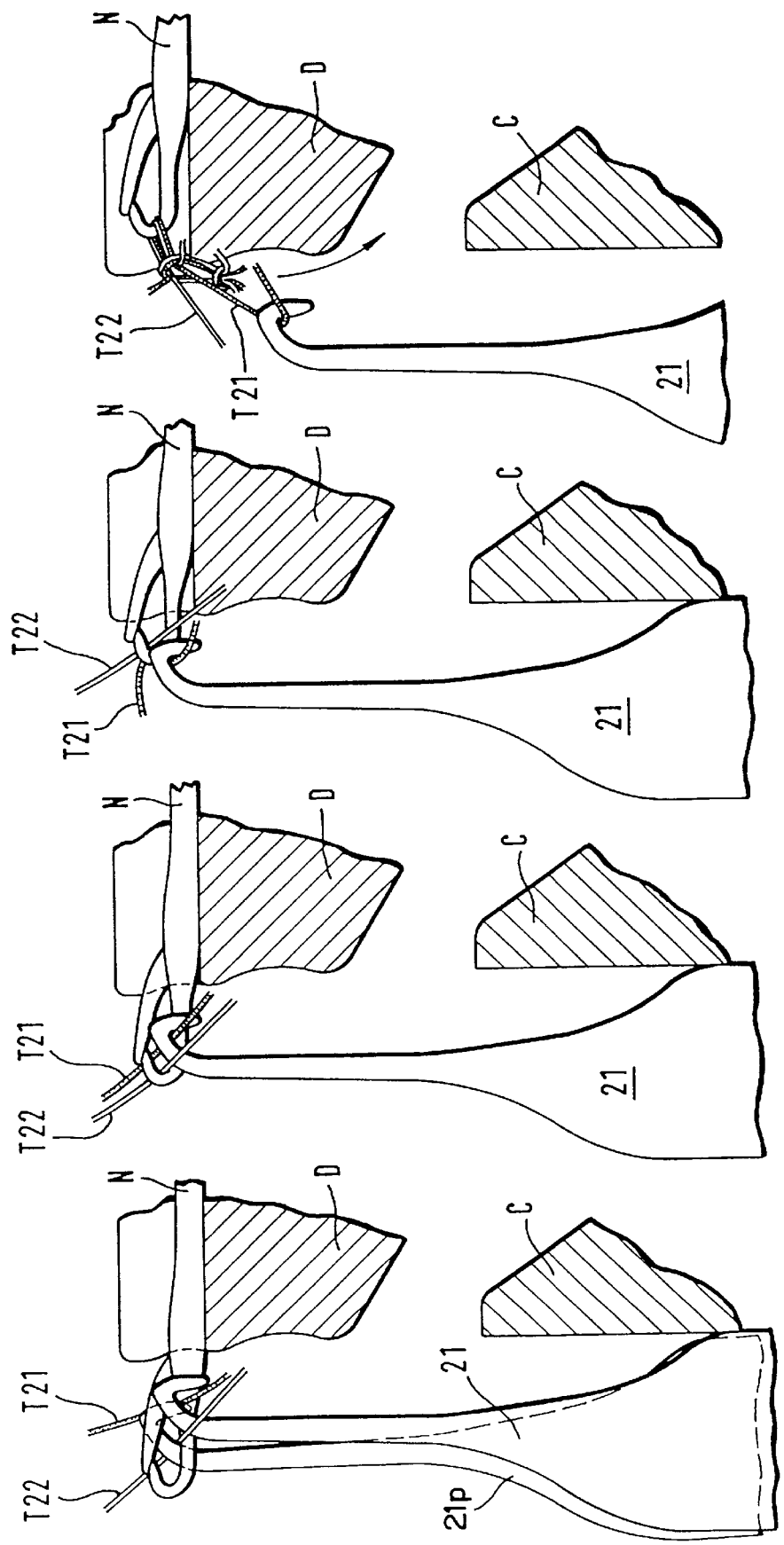

PILE FABRIC METHODS AND CIRCULAR KNITTING MACHINES WITH IMPROVED PILE ELEMENTS FOR MANUFACTURING AFORESAID

BACKGROUND OF THE INVENTION

1. Field of the Invention

An improved knit pile fabric, the methods therefor and circular knitting machinery with improved pile elements for manufacturing the improved knit pile fabric.

2. Description of the Prior Art

Knitted pile fabrics are generally composed of ground yarns forming a ground fabric in different constructions to which pile yarns, forming protruding pile loops, are meshed.

In the overwhelming majority of proposals for knitting pile fabrics the knitting of the base or ground fabric and the forming of pile loops is realized simultaneously by knitting the ground yarn and the pile yarn together into stitches cross the complete course.

With exception of the proposal described in the German Patent No. 671 333 thereby exclusively one pile yarn is knitted together with one ground yarn to stitches. If the ground fabric is knitted into plain single jersey courses a pattern is exclusively obtained by selecting the pile elements for pile forming or plating (non-pile forming) or forming pile loops of different length (for example as described in the German Patent No. 656 588, British Patent No. 462.662, U.S. Pat. No. 3,477,255). Colored patterns are produced by feeding different pile yarns to a sequence of succeeding feeders and knitting pile loops in one of the feeders in a predetermined section and meanwhile the other courses in this portion are composed of plated stitches. As a result, the pile density is reduced according to the number of courses knitted in a sequence, so that for a sufficient pile density the sequence of different pile yarns is limited usually to two.

Based on the foregoing described method for pile knitting the number of pile yarns in a complete course is only increaseable by knitting a predetermined number of sectional courses in a sequence of at least two feeders after which the complete course is realized. Such methods are described in the proposals according to the U.S. Pat. Nos. 2,710,527; 4,409,800; German Patents 1 153 482; 1 585 051; in which ground yarn and pile yarn floats will spread over the wales knitted from alternative pile and ground yarn. The manufacturing of patterned pile fabrics according to this proposals is limited by the floats of the ground yarns which will also project from the fabric if they spread over more than three wales whereby they may be cut off in the required shearing operation after knitting to remove the float portions of the pile yarns and making the pattern visible.

To avoid longer floats from the ground yarn when knitting partial sections of a fabric, it is proposed, according to European Patent No. 0 043 135 (corresponding to U.S. Pat. No. 4,633,683) to arrange the ground yarn between the knitting sections in a lay-in (accordion-type) structure. In a further proposal, referenced European Patent No. 0 072 425, the non-knitting, respectively non-pile forming yarns are tied into the ground fabric in a laying structure, so that this fabric is usable after knitting in the looped construction.

Lay-in portions of yarns excluded at least from knitting ground fabric will widen the fabric width and will reduce also the course density and therefore also the pile density and the elasticity of the fabric.

To overcome such limitations a number of proposals over the last fifteen years have been made to knit at least two pile forming yarns into a ground fabric from one ground yarn. To avoid the handicaps of the method referred in the German Patent No. 671 333, resulting from the required exact adjustment of the yarn carrier for feeding a first pile yarn to a first group of needles and arranging thereafter this first pile yarn in the backs of the needles of a second group of needles, whereby an unverifiable tensioning of the first pile yarn (especially according to the provided pile length, yarn friction, alteration of the needles etc.) must be accepted; it is proposed to provide subsequent sections of ground and pile yarn feeders in which at least the pile yarns are sinked or prelooped to sectional pile loop portions which are knit in a final section of a knitting sequence together with a ground yarn to a complete course. Methods for manufacturing this type of fabric are described in the U.S. Pat. Nos. 4,612,784; 4,989,421; 5,167,133; European Patent Publications No. 0 335 618; 0 594 187; 0 629 727; German Patent Publications No. 40 33 735; 41 29 845; 195 05 646.

As referred in these publications the ground yarn will knit exclusively with one of the pile yarns sectionally Predetermined pile areas, so that the pile yarns excluded from pile knitting will spread or float over the pile portions from alternative pile yarns. Therefore it is supposed that these floats are removed by a shearing process subsequent to knitting. Resulting from this exclusively, velour-type fabrics can be produced while an increased shearing loss, according to the number of pile yarns per course, must be accepted.

To reduce the percentage of pile yarns in the fabric, respectively using courser pile yarns without increasing the portion of pile yarns in the fabric, it is provided in some proposals to mesh the pile yarns into the fabric by tucking.

Analogous to the above-mentioned proposals it is proposed, according to the proposal of European Patent Publication No. 0 484 692, to sink or pre-loop on at least two succeeding pile yarn feeders, alternatively, sectional pile loops and clearing these pile loops from the needle latches in the final ground yarn feeder, so that the pile loops are meshed into the ground fabric by tucking. The overspreading pile yarn portions must be also removed by shearing as referred before.

It is noted that pile fabrics incorporating the pile yarns by tucking are also described according to the proposals of U.S. Pat. Nos. 4,043,151; 4,409,800; European Patent Nos. 0 422 917; and British Patent No. 830,219.

To avoid floats from the pile yarns spreading over pile sections from alternative pile yarns it is proposed, in the German Patent Publication No. 27 04 295, to knit two pile yarns in subsequent feeders in alternate wales to a continuous lay-in construction where, in each feeder, predetermined pile elements draw out pile loops. Both pile yarns are meshed to a plain ground course.

With this proposal it is exclusively possible to knit two pile yarns into a course without floats in the pile yarn so that the fabric can be used with the original loop structure or with severed pile loops with a reduced shearing loss. The disadvantage of this proposal is that only two pile yarns can by meshed to a ground fabric when a sufficient pile density will be obtained and the pile yarns are meshed to the base fabric exclusively by tucking, which will reduce the pile density.

SUMMARY OF THE INVENTION

With the foregoing in mind it is the object of the present invention to create a knitted pile fabric comprising courses from which the pile loops of at least two pile yarns will protrude so that this looped structure as well as the pile loops can De severed in the knitting machine to avoid a high shearing loss and to increase the quality of the velour-type surface of the fabric.

A further object is that the meshing of the pile yarns to the ground fabric is realized in different fabric constructions so that the fabric can be adapted to required conditions.

A further object is that the pile loops arranged in a course can be drawn to different lengths.

A further object is that the pile yarns are not sinked (prelooped) prior to the meshing into the ground fabric when they are knitted to stitches.

BRIEF DESCRIPTION OF THE INVENTION

The general objects of the present invention are solved by manufacturing pile fabrics on circular knitting machines having at least two cooperating beds, one supporting respective movable knitting needles, which will mesh across a complete course together simultaneously at least two pile yarns to or into the fabric continuously, and supporting in the other bed hooked pile elements that move transversely in cooperation to and between the knitting needles, engaging one of the pile yarns and drawing out pile loops from at least two pile yarns in succeeding wales, respectively, thereby forming pattern areas.

According to this concept the pile yarns can be meshed by knitting stitches as well as being formed into a lay-in structure into a ground fabric.

When the pile yarns are knitted to stitches at least one of the pile yarns is knitted into ground yarn portions, with regular sinker loops, meanwhile the other pile yarn is drawn to pile loops or elongated sinker loops, so that the ground yarn portions of the pile yarns will substitute as an independent ground fabric knit from a ground yarn.

Ground yarns are required for knitting a ground fabric if pile yarns are meshed in by developing a lay-in structure, but such a ground fabric can also contain pile yarns so that a patterned pile fabric from more than three pile yarns with a high pile density can be prepared.

For manufacturing velour-like fabrics the present invention enables the severing of pile loops in the knitting machine preferably in association with the proposals according to U.S. Pat. No. 4,592,212, and the further improvement of German Patent Application 195 18 490, so that an increased shearing loss is avoided and pile material can De saved by knitting shorter pile loops.

Manufacturing pile fabrics with pile loops severed in the knitting machine will require a circular knitting machine with a dial, a cylinder and a sinker ring according to the requirements described in the above referred documents.

In contrast to this for manufacturing looped pile fabrics, which are applicable in the knitted loop structure or San be finished into a velour-type fabric, the circular knitting machine will have two cooperating beds in which the knitting needles can be arranged alternatively in one of the beds and the pile elements in the other. By different positions in the loop-forming action pile loops of different length in each course can be provided.

The pile elements for manufacturing the pile fabrics according to the present invention are characterized by a hooked portion, in which the peak of the hook is staggered to the radius of the inner arc of the hook towards to the hook opening, so that a guiding ledge towards to the backs of the pile elements is formed, which will support the correct feeding and disposition of the pile yarns. For severing of the pile loops the pile elements have a cutting Ledge spaced from the hook in continuation of the stems (loop guiding portion), cooperating with cutting ledges of 1 cutting element. Pile elements for manufacturing looped fabric structures are additionally pivotable for controlling the pile yarns separately one another. This allows unaffected movement of each pile yarn between feeding and stitch forming by arranging the pile yarns in different positions.

BRIEF DESCRIPTION OF THE DRAWINGS

Other objects, features, and characteristics of the invention will become apparent upon consideration of the following description and the appended claims with reference to the accompanying drawings, all of which form a part of this specification and wherein like reference numerals represent corresponding parts in the various views.

FIG. 6 is a simplified schematic cross section of a circular knitting machine for manufacturing novel pile fabrics with cutting the loops in the machine.

FIG. 6*a* is an enlarged side view of a needle and a pile element actuated to engage a pile forming yarn.

FIG. 9*a* is also a view from the top to this section, while

FIGS. 10 to 14 are detailed side views to the needles and pile elements in their relative position to each other according to the positions indicated by V to IX in FIG. 7.

FIG. 46 to FIG. 52 are detailed positions of pile elements and needles corresponding to the positions F1, F2 and section K in FIG. 45.

DETAILED DESCRIPTION OF PREFERRED EMBODIMENTS

Figure 1:
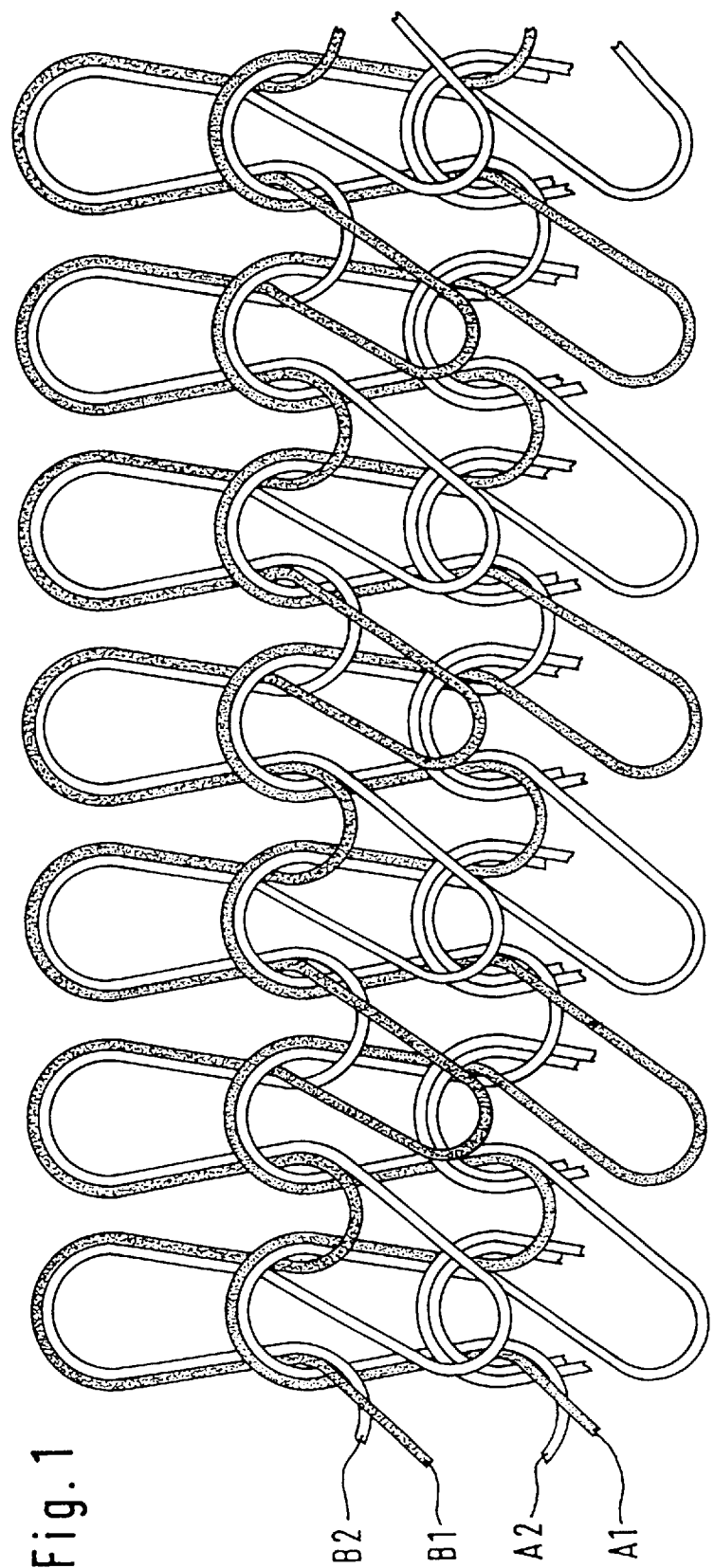
FIGS. 1 to 5 are extracts of fabric constructions according to the present invention.

FIG. 1 illustrates a pile fabric characterized by alternating pile loops from the both pile yarns. Both courses are composed from first pile yarns A1, B1 and second pile yarns A2, B2 alternatively forming pile loops, respectively, or regular sinker loops. The sinker loops connecting adjacent stitches, from which pile shanks from the same pile yarn will protrude, ensure an improved tie-in of the pile shanks into the fabric whereby by the pile formation from two pile yarns with full pile density is realized. From the illustration it is also visible that an additional ground yarn is principally not required when the friction of the pile yarns to another and the stitch density is sufficient for providing the solidity of the fabric.

According to the intentions of the fabric designer the pile loops of the pile yarns are arranged between the same wales, as shown, or can be staggered in subsequent courses in a desired cycle.

With the described advantage of the improved meshing of the pile loops this fabric is an advance in knitting plain pile fabrics.

Figure 2:
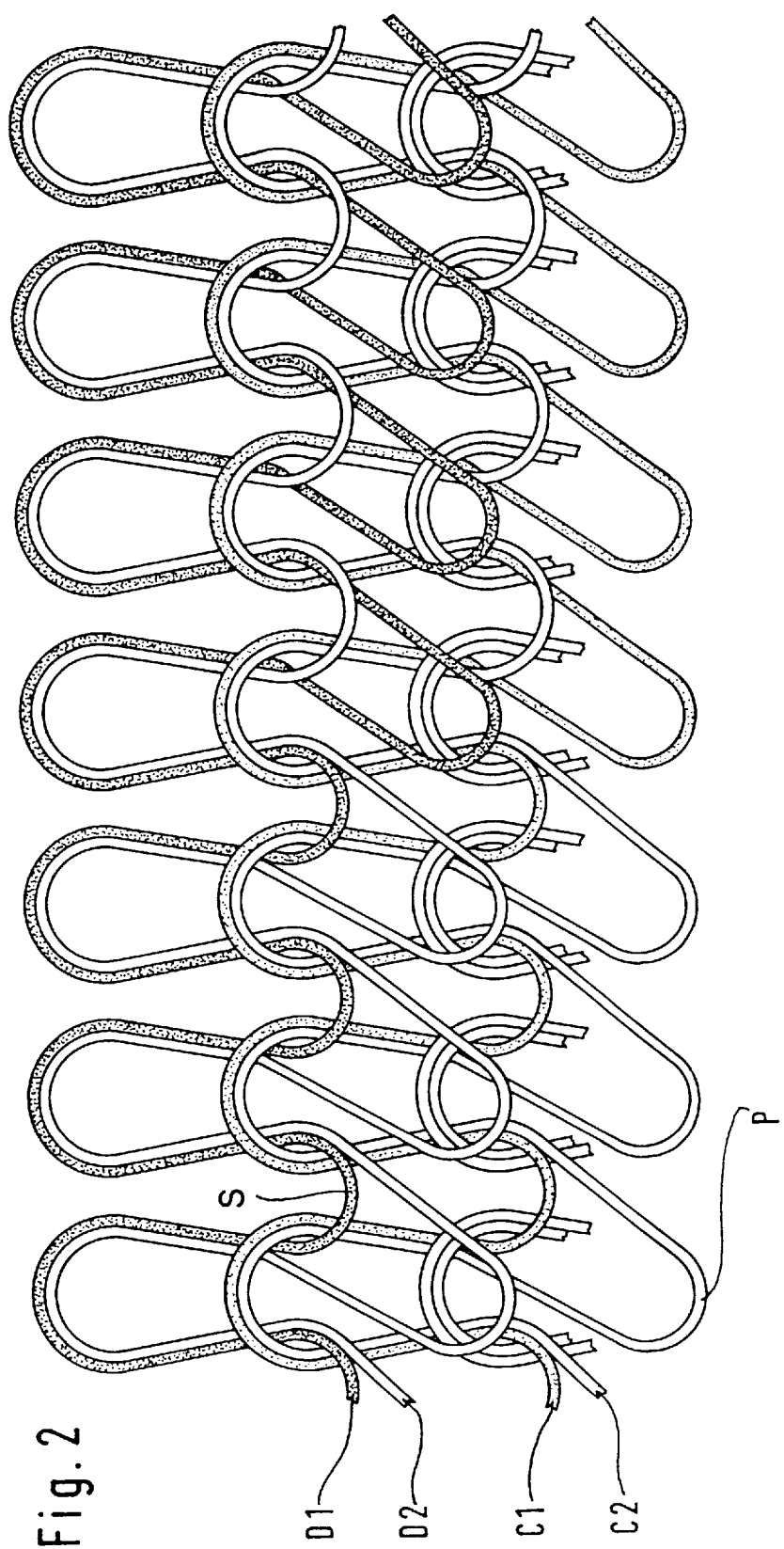

In FIG. 2 a part of a patterned pile fabric from two pile yarns is shown and illustrates an alternative knitting of ground yarn portions and pile loop portion from each pile yarn. The first pile yarns C1, D1 are knit into regular sinker loops S when the second pile yarn C2, D2 is drawn to pile loops P. Then, the first pile yarns C1, D1 are drawn into pile loops while the second pile yarns C2, D2 are knit into regular sinker loops. If required the solidity of the fabric on the alternation of the pile forming from one to the other pile yarn is improved by feeding an additional ground yarn.

Figure 3:
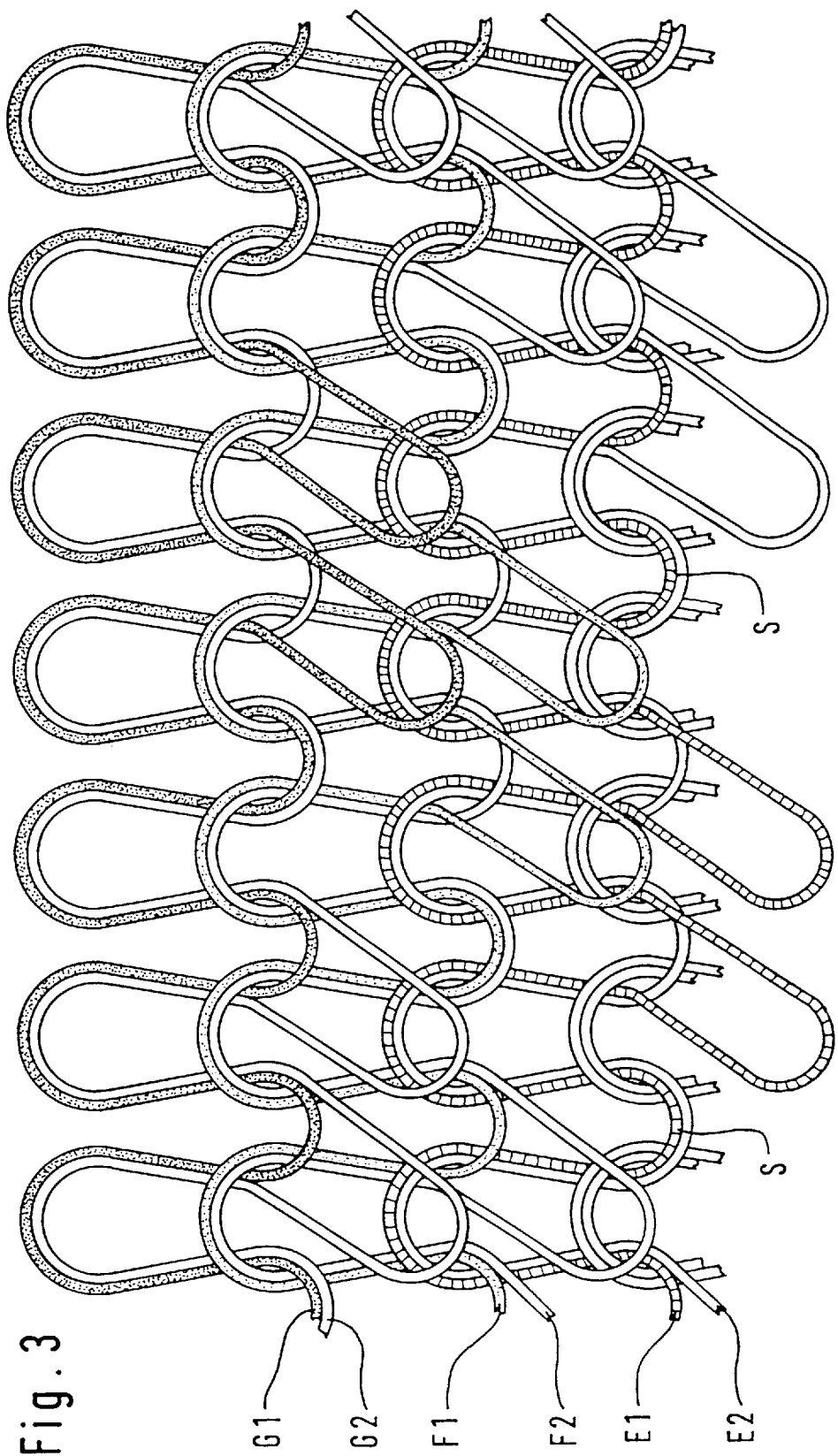

A sufficient solidity of the fabric is obtained when on the alteration of the pile forming from one to the other pile yarn a regular sinker loop S is provided as shown in FIG. 3. Pile areas from a first pile yarn E1, F1, G1 are connected by a regular sinker loop S with the pile areas from the second pile yarn E2, F2, G2.

Figure 4:
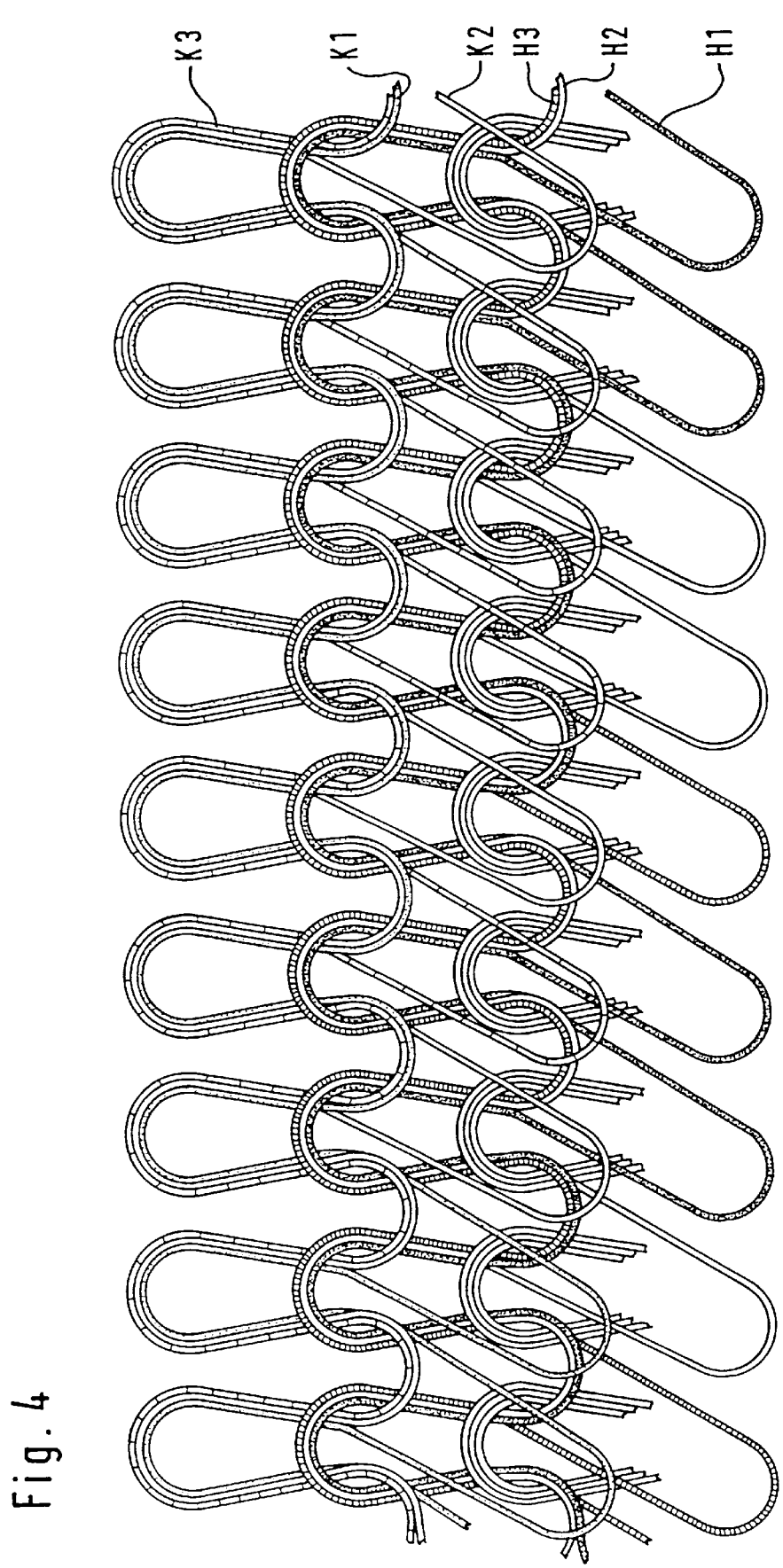

FIG. 4 illustrates a section of a fabric in which the courses are composed from three pile forming yarns. A first course is shown as being knit from yarns H1, H2 and H3, and a second course from yarns K1, K2 and K3. According to the sequence of one exemplary pattern, the pile loops from one of the pile yarns will alternate. Alternatively, the regular sinker loops can be formed from both other yarns and will ensure a sufficiently solid fabric.

If more than three colors in one line of a pattern are provided it is necessary to distribute the different colors into two succeeding courses where, in each course, the pile forming is suspended when pile loops are arranged in the other course. This patterning is well known and the reduced pile density can be improved by an increased course-density and higher pile loops. Especially when velour-type fabrics are produced it is recommended to sever the pile loops in the machine as described.

If the dial is equipped with at least two different needle groups, alternating with one another, fabrics according to the invention can be manufactured by a knit and miss base fabric construction in the same way as described. Such base fabric constructions are well known (for example from the additional U.S. Pat. Nos. 2,710,527 and 4,409,800). In contrast to the description of the embodiments only one group of the needles is raised and the other group will miss. In the subsequent feeder the needle groups are alternatively raised for knitting according to a predetermined sequence, for example, according to the referred documents.

With two different groups of needles it is also practicable to mesh the pile yarns in a lay-in structure into the fabric. To obtain this structure alternate needles are raised into tuck position and after feeding the pile forming yarns is described in the embodiments the needles are retracted to knock over. The needles with the tucks of the pile yarns remain in the subsequent feeder in miss position meanwhile the alternative needles are raised to a clearing position and will knit, at least with a ground yarn, single threaded stitches. Thereafter, the floats of this ground yarn will tie in the previous tucked pile yarns into the fabric and will prevent movement of the pile yarns when the needles are raised in a subsequent feeder.

Figure 5:
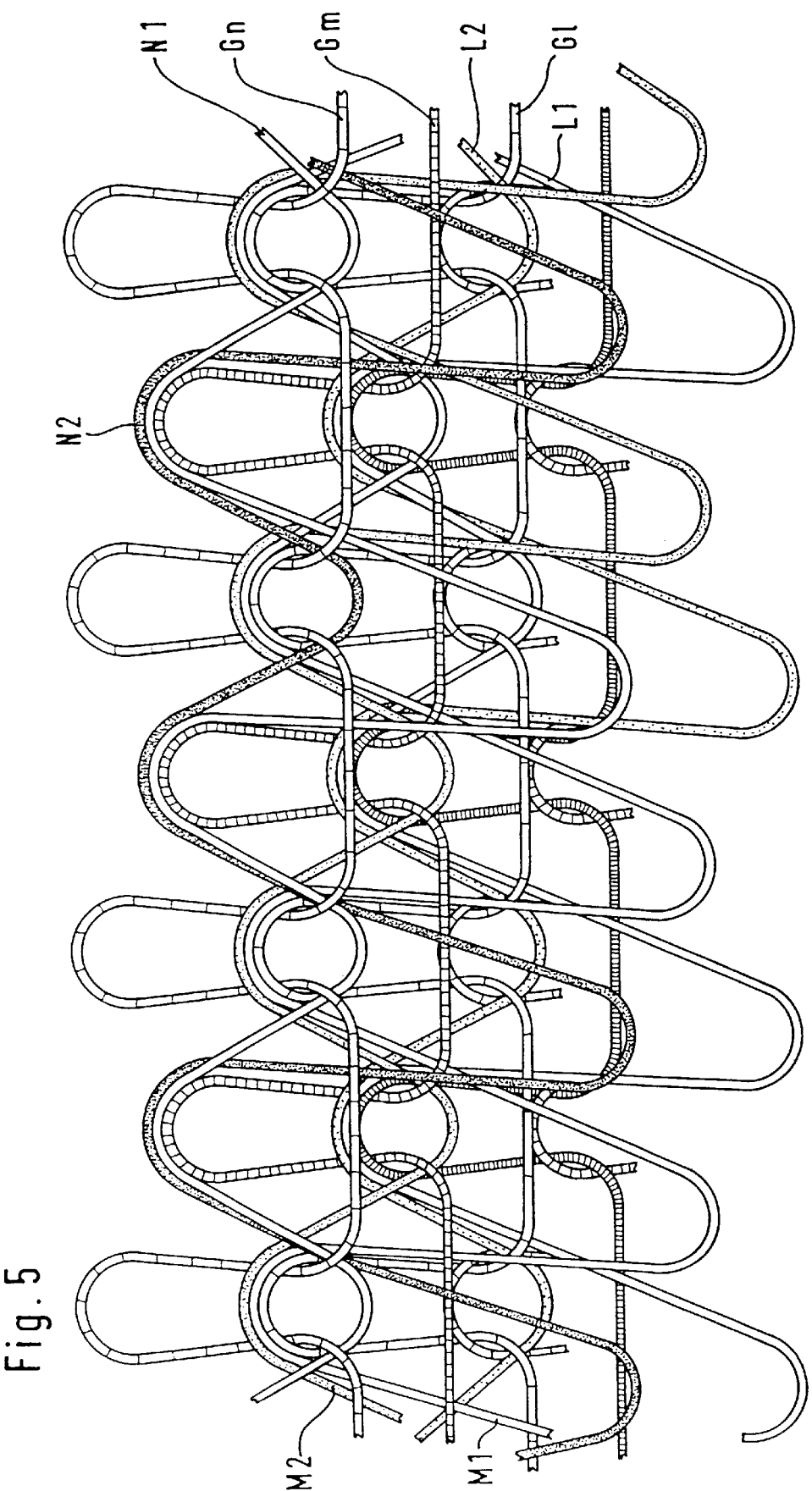

A fabric of this type is illustrated in FIG. 5. The pile yarns L1 and L2 are meshed together with the ground fabric in a lay-in structure and will form alternatively pile loops from one of these yarns. The pile yarns L1 and L2 are then tied into the fabric with the floats of yarn G1 knitted in alternate wales to stitches. Subsequently, the pile yarns M1 and M2 will be tucked in these wales and yarn Gm is knit in the alternative wales, by clearing the tucks of yarns L1 and L2 from these needles, and meshing in the tucks of yarns M1 and M2. To the stitches of yarn Gm the tucks of yarns N1 and N2 are arranged, which are tied in into the fabric from yarn Gn.

As well known a lay-in structure enables the engagement of courser yarns so that a high density pile is obtained.

In addition to the above described fabric, the stitches of the intermeshing yarns can be knit at least from two pile forming yarns as described in the embodiments throughout. In this way also fabrics with more than three different yarns in one line or course are arranged without a reduction of the pile density.

The lay-in structure of the pile yarns can be intermeshed into a plain course from all needles when the dial-needles cooperate with holding sinkers as proposed, for example, in the German Patent Publication 27 04 295.

The illustrations according to FIGS. 1 to 5 and the description to them provide an impression of the wide range of fabric constructions which can be created by the application of the present invention.

Turning now to the apparatus, the simplified cross section of a circular knitting machine in FIG. 6 shows an arrangement of needles N in a dial D and pile elements 1 in a cylinder C. The pile elements 1 are collectively actuated by their butt 1b or individually by control jacks 3 in the form of two arm levers with a butt 3a on the upper portion and a butt 3b on the lower portion. The control jacks 3 are arranged in a recessed portion of the pile elements 1 and are positioned by known patterning devices from a reset position, in which all upper butts are depressed to the cylinder and all butts 3b are protruding from them individually, to a selecting position with an opposite arrangement of the butts 3a and 3b. Each protruding butt is controllable by cooperating cams as later described according to FIG. 7.

The needles 1 in the dial D are actuated collectively from cams all together to knit a plain fabric or in at least two groups in a predetermined different knitting cycle for knitting basic ground fabric structures. Needle control and cams are well known by persons skilled in the art.

For severing the pile loops cutting elements 2 are arranged in a sinker ring S which is mounted to the cylinder or is separately arranged and driven synchronously with the cylinder and dial.

As is visible in FIG. 6a an inclined knitting ledge Dk, cooperating with the needle hooks of needles N, is provided on the dial to improve the regular plating of the yarns. The pile elements 1 are characterized by a hook at the top end with a peak 1p advanced forward relative to the arc of the hook nearby in line with the neb 1n. From peak 1p a positioning ledge is inclined toward the dial and will support the separation of the pile forming yarns. Pile loops can be drawn out from the arcs of the hooks or the stem portion Pk of the pile elements.

The pile elements 1 have a sharpened cutting ledge 1c along the lower part of the stems to sever pile loops ledge 1c is positioned opposite cutting ledge 2c of cutting element 2. Arrangement of the cutting ledges 2 to one another and the procedure of severing the pile loops are described according to FIGS. 2 and 3 of the earlier German Patent application 195 18 490.4, respectively, U.S. Pat. No. 4,592,212 which are herewith fully incorporated by way of reference for further details.

Figure 7:
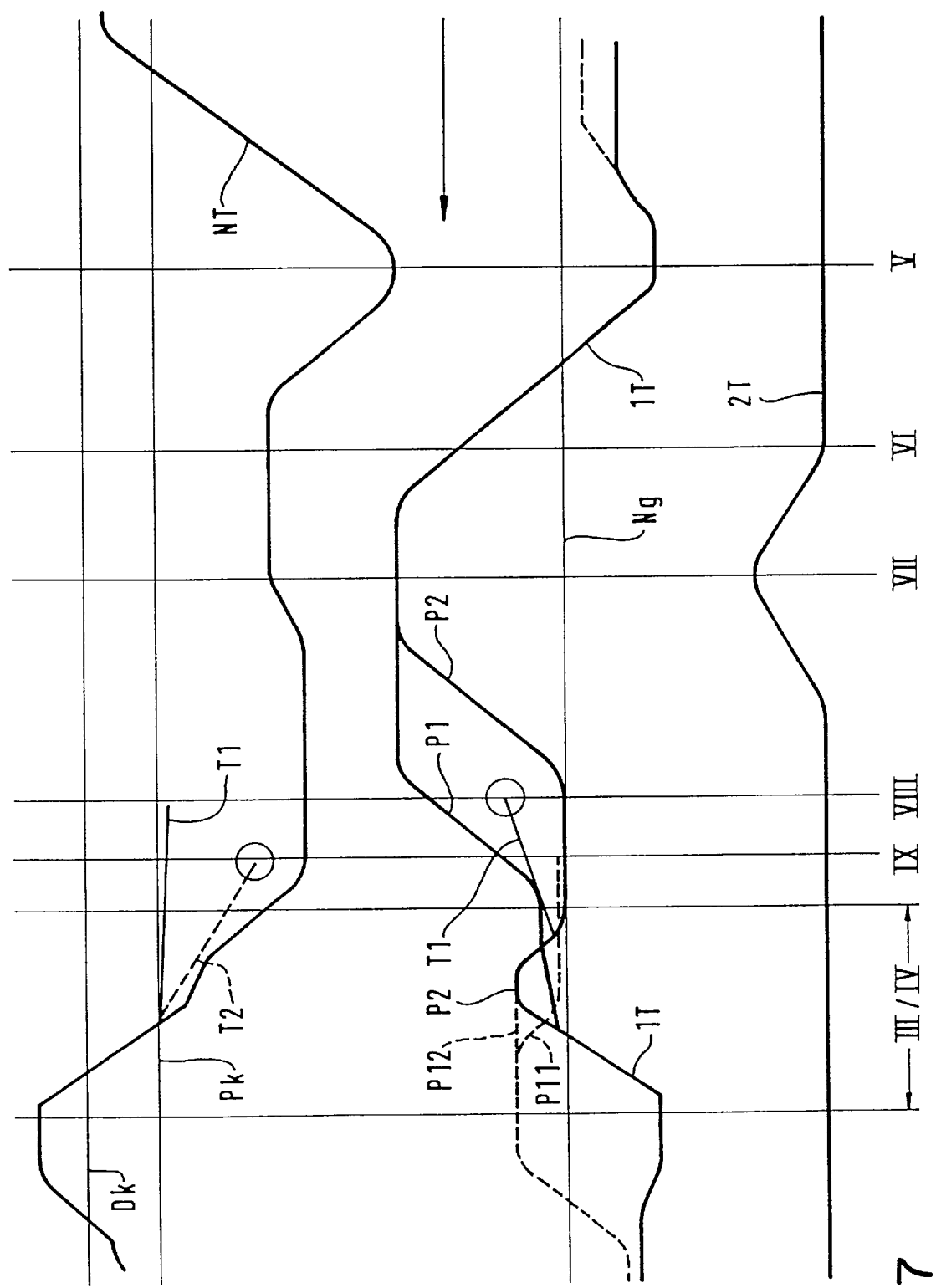
FIG. 7 is a diagram showing the tracks of needles, pile and cutting elements in relation to each other for a first embodiment knitting with two pile forming yarns.

Movement of the needles N to produce a plain fabric is shown in FIG. 7 with the pile elements 1 knitting alternately with one of two pile yarns and the cutting elements 2. According to the tracks of these elements the cams therefore are shaped.

Figure 12:
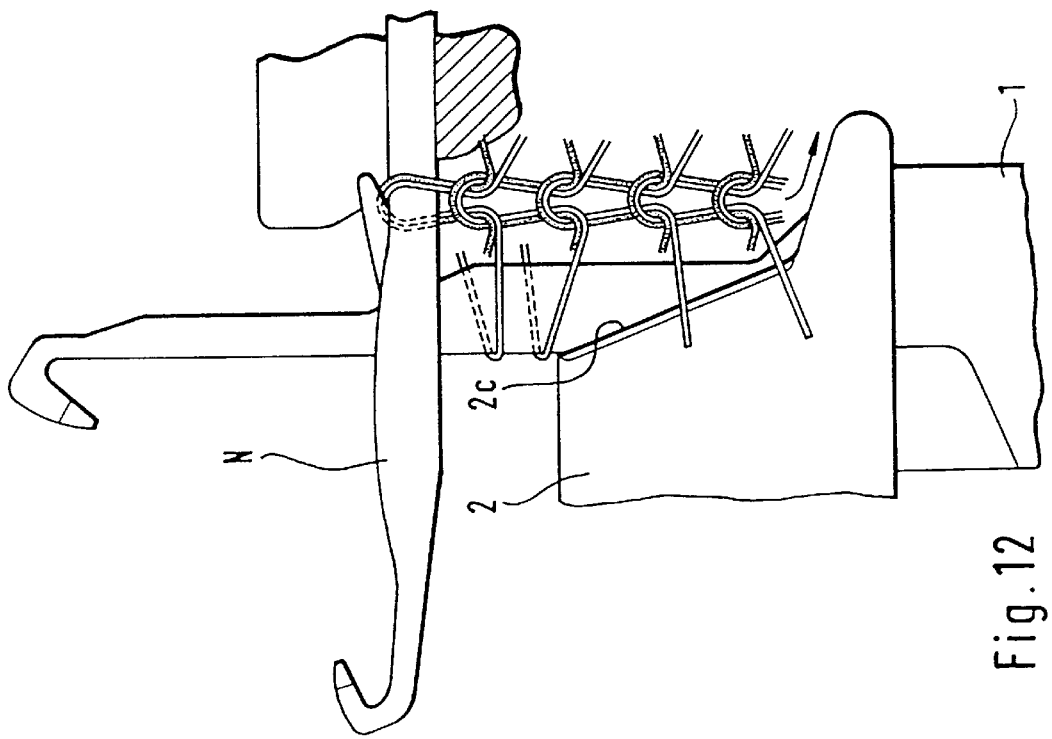

Needles 1 are controlled according to track NT to a clearing position. At this time all pile elements are retracted according to track 1T in position v to straighten out the previous knitted pile loops so that their stitch portions (see FIG. 10), which may be enlarged by the needle movement, re retracted and tighten around the needle stems to obtain 1 clear stitch side of the fabric. Thereafter, all pile elements 1 are raised to a cutting position, and the needles N are retracted to a feeding position. Nearby to the approach of the pile elements 1 in cutting position the cutting elements 2 are actuated according to track 2T to the center of the machine, thereby performing a scissor-like severing of such pile loops which are previously arranged in-between the cutting ledges 1c and 2c (position VI respectively FIG. 11) by permanent knitting. The cutting action is terminated in position VII of FIG. 7, and as shown in FIG. 12 where the cutting ledge 2c has passed cutting ledge 1c of the pile element. Thereafter, the cutting elements 2 are retracted to their idle position. Simultaneously to the stretching action of the pile loops (position V in FIG. 7) the control jacks 3A will be positioned in a reset position by depressing butts 3a into the cylinder. Subsequently, the control jacks 3 are actuated from a mechanical or electronic selecting device individually to a selected position. Patterning controls corresponding to the above description are known, for example, from the documents DE-A1-23 64 138 or DE-A1 24 47 427.

Figure 13:
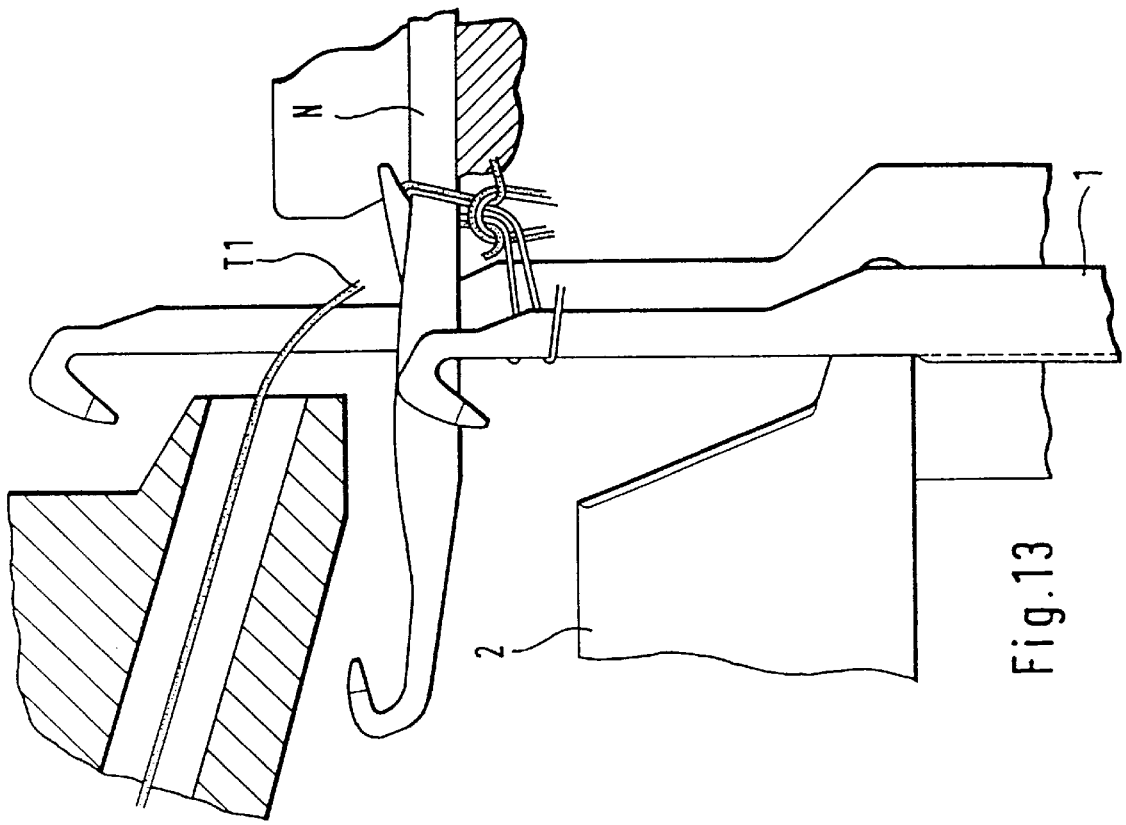

Shortly advanced to the end of the retraction of cutting elements 2 into idle position the pile elements predetermined to miss the first pile yarn are retracted according to track P2 from cams acting on butts 3a below the cheeks of the needles (position VIII in FIG. 7). At this time, shown also in FIG. 13, a first pile yarn T1 is fed to the pile elements remaining in feeding position according track P1, whereafter these pile elements are retracted to an intermediate position (position IX in FIG. 7) in which the hooks of the pile elements will control the engaged pile yarn T1, unaffected by this movement to the stitch forming action above the needle cheeks, shown in FIG. 9.

Figure 14:
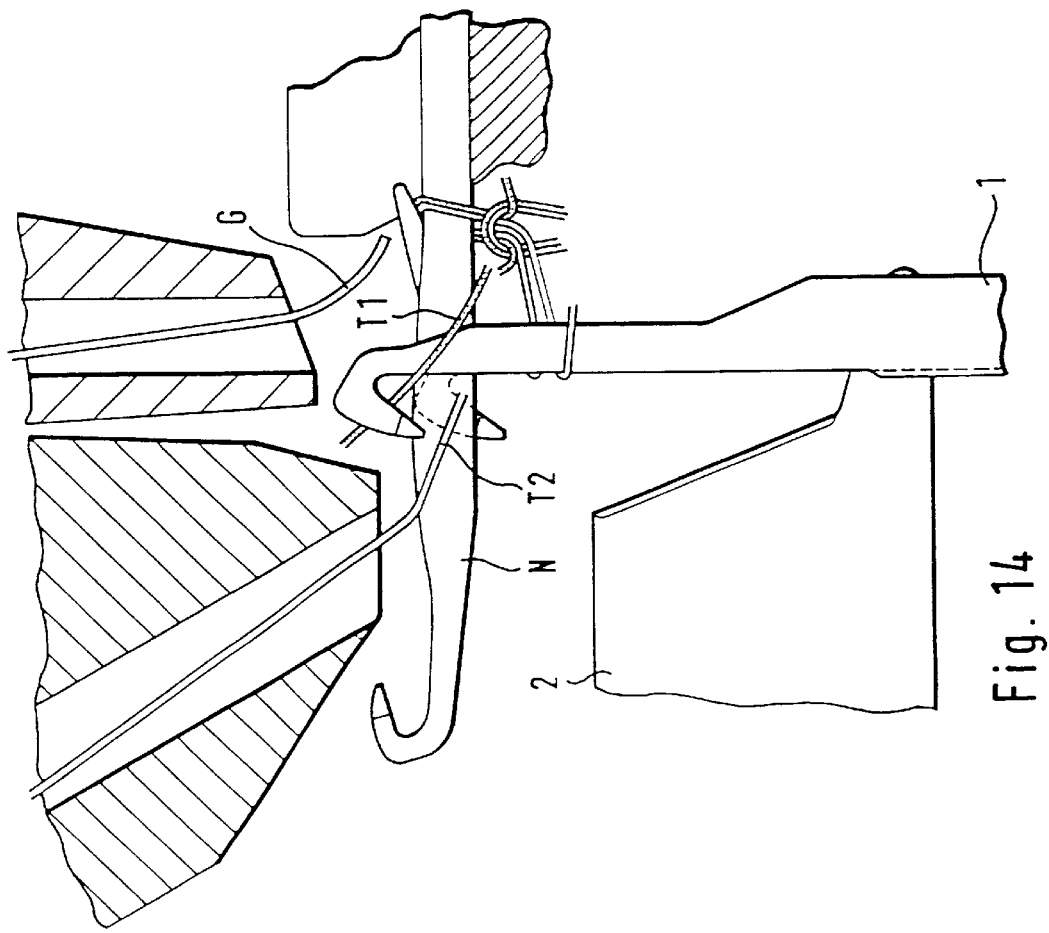

Also at position IX of FIG. 2 a second pile yarn T2 and if provided a ground yarn G is fed (FIG. 14).

Immediately with the feeding of the second pile yarn T2 the needles N start their retraction for stitch forming action.

Figure 8A:
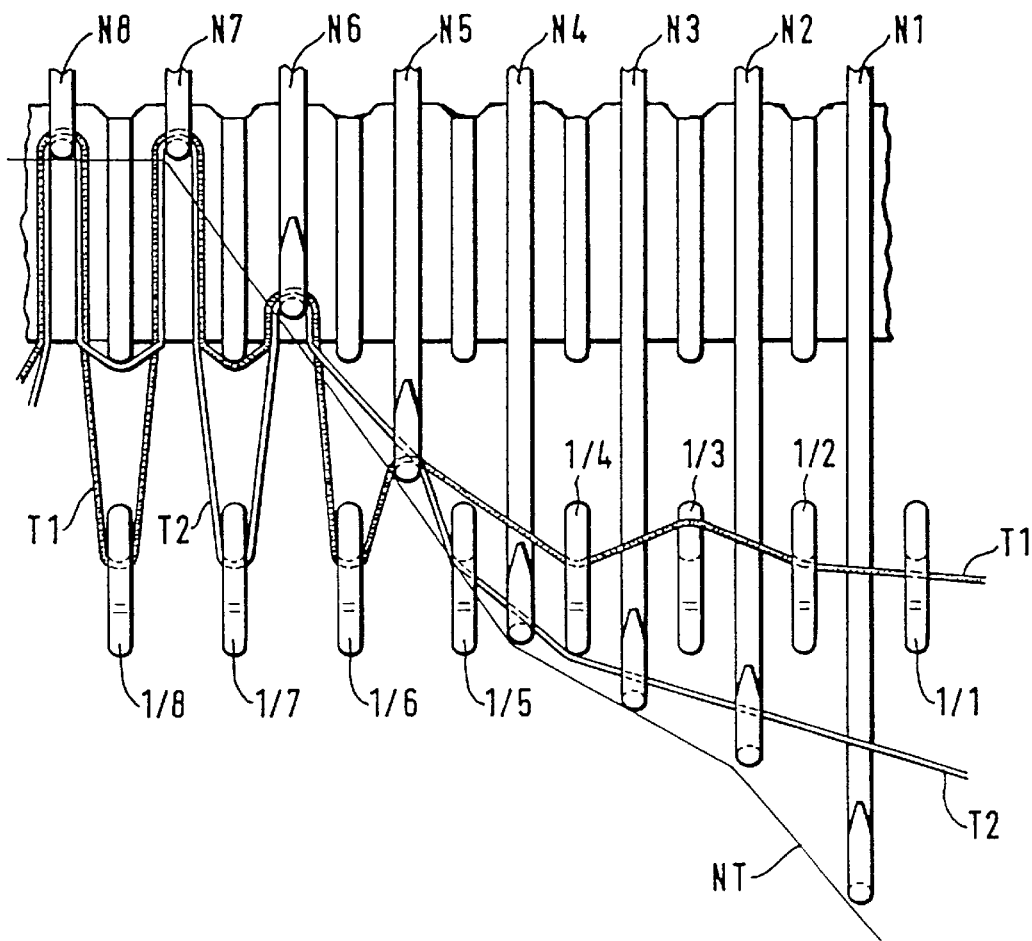
FIG. 8*a* is a view from the top to the stitch forming section as marked with III/IV in FIG. 7.
Figure 8B:
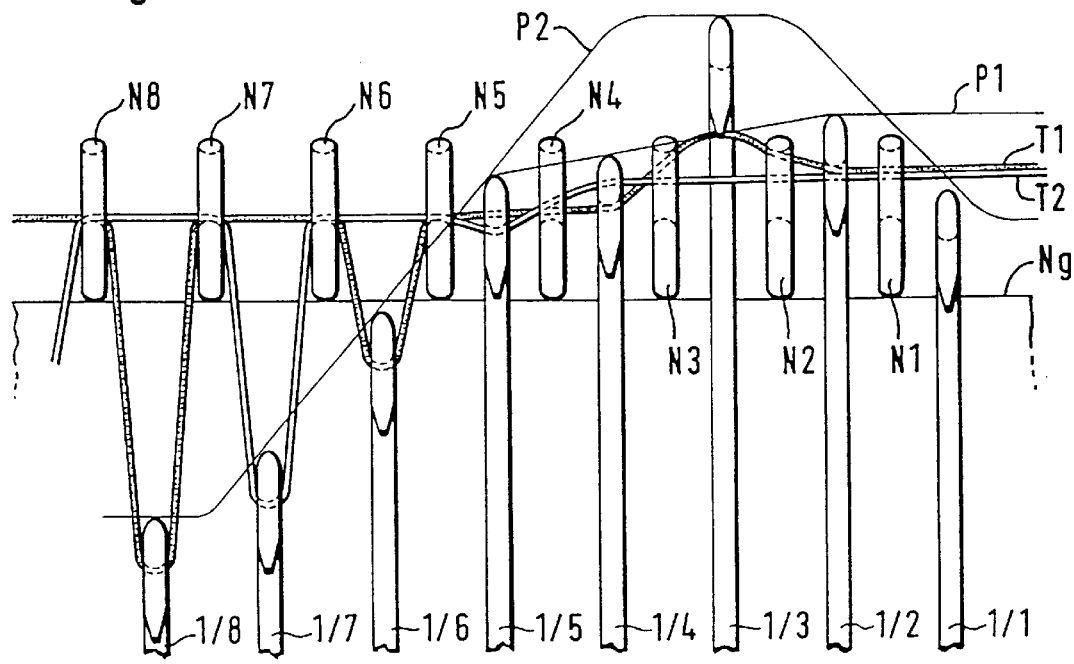
FIG. 8*b* is a view from the front to the same section.
Figure 9A:
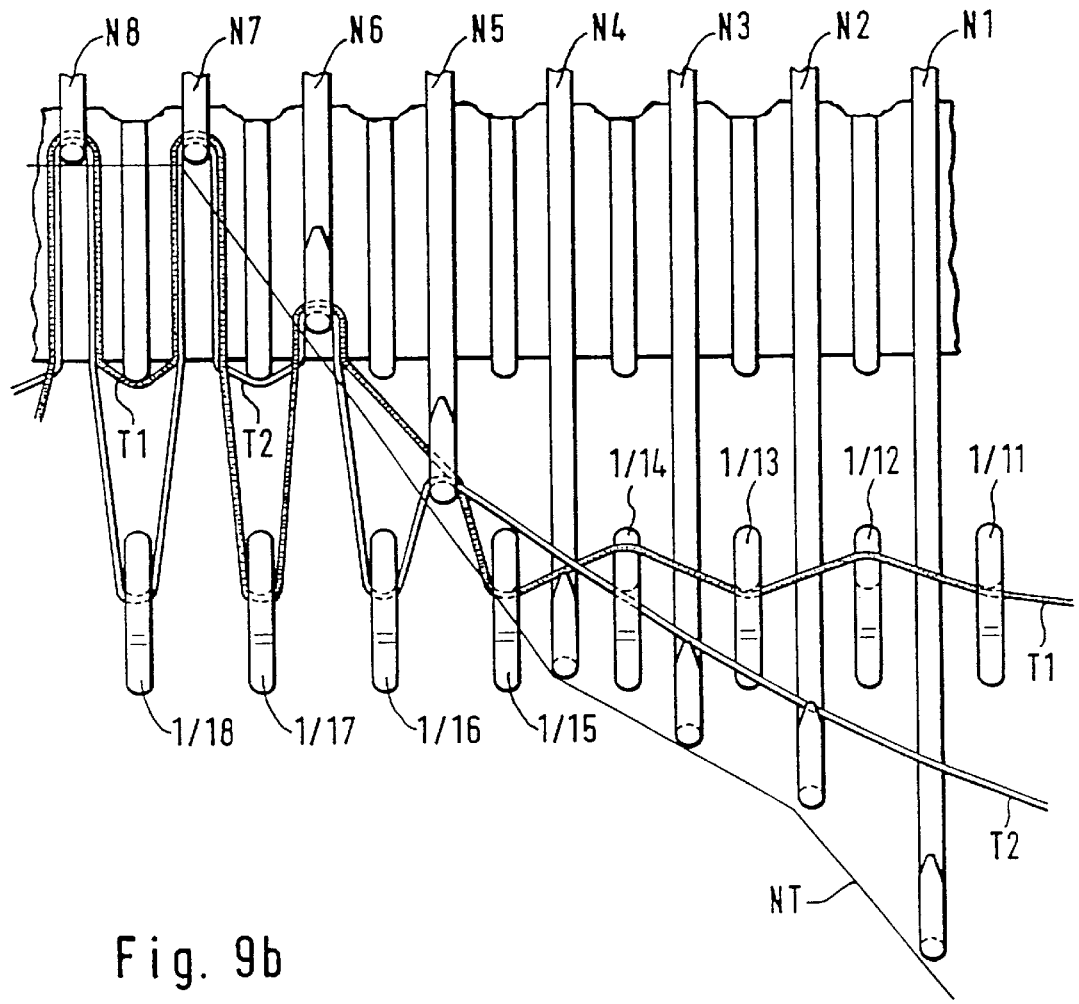
Figure 9B:
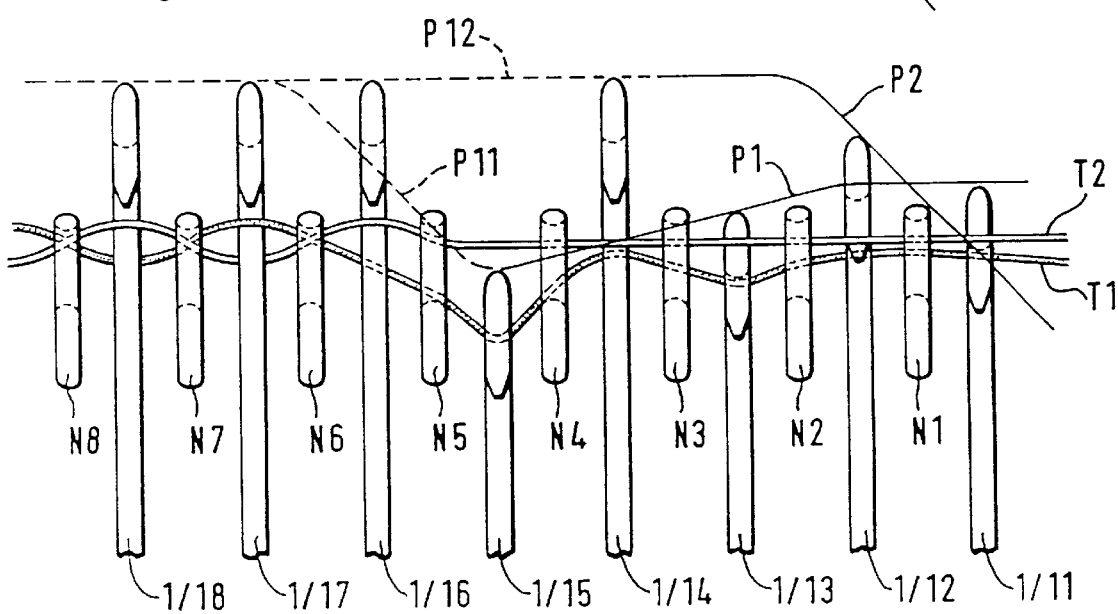
FIG. 9*b* is a front view with an alternative control of the pile elements to FIG. 8*b*.

The movement of pile elements simultaneously with the stitch forming action of the needles is performed, in one way, corresponding with the tracks P1, P2 and 1T, as shown in more detail in FIGS. 8a and 8b, or on the other hand corresponding to tracks P11 and P12, as shown in dash lines and illustrated in detail in FIGS. 9a and 9b.

Referring now to the FIGS. 8a and 8b the second pile yarn T2 is engaged by the needle hooks and drawn to the dial. Shortly before the pile yarn T2 approaches pile elements 1, pile elements predetermined to engage the second pile yarn T2 are raised corresponding to track P2. Such predetermined pile elements will be all previous ones which have missed the first pile yarn T1 or in respect to an additional selection at least a part of them. In FIG. 8b pile element 1/1 will start raising for engaging the second pile yarn T2; pile element 1/3 is already positioned to do this.

Figure 15:
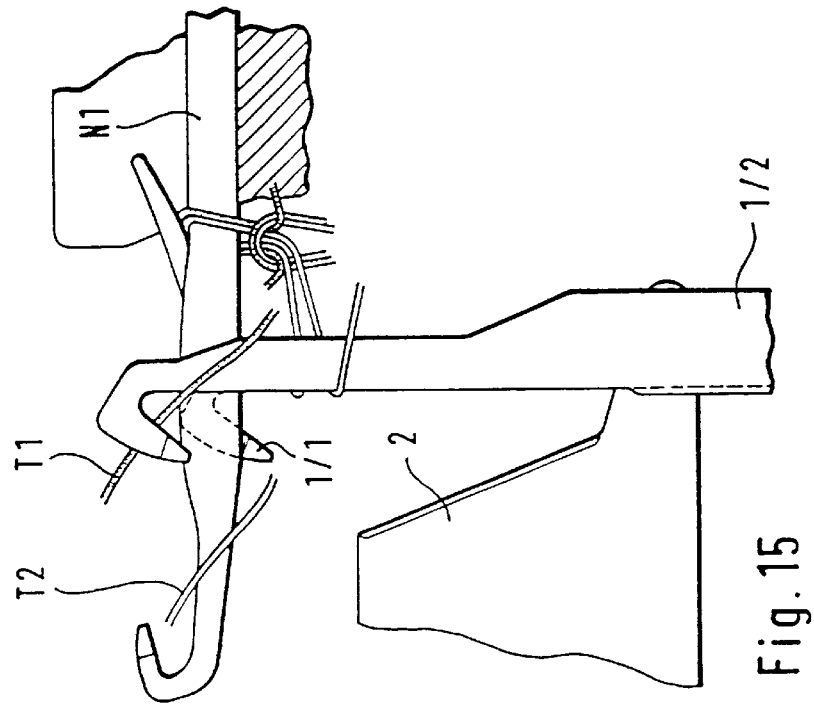
FIGS. 15 to 21 are side views to each needle N1 to N7 of FIG. 8*a* and 8*b* in cooperation with the adjacent pile elements.
Figure 16:
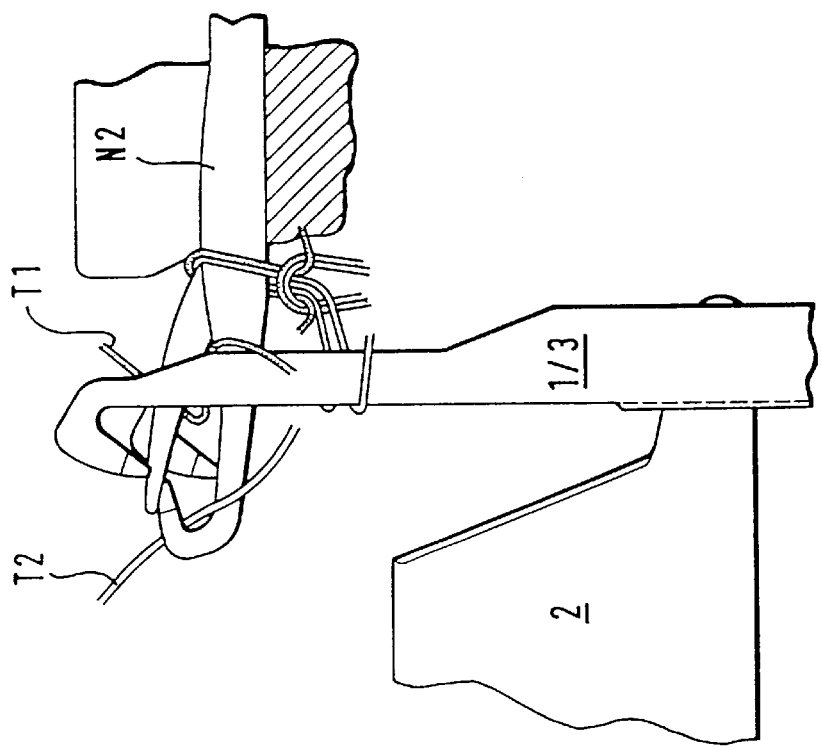

Starting out from FIG. 15 a pile element raising for engaging the second pile yarn T2 (1/1 in dash lines) will penetrate first with their peaks in front of the first pile yarn T1 through the needle line. By this action the positioning ledge 1S will shift pile yarn T1 onto the back of the raising pile elements as shown in FIG. 16 according to the arrangement of the relevant needles and pile elements in FIGS. 8a and 8b.

Figure 17:
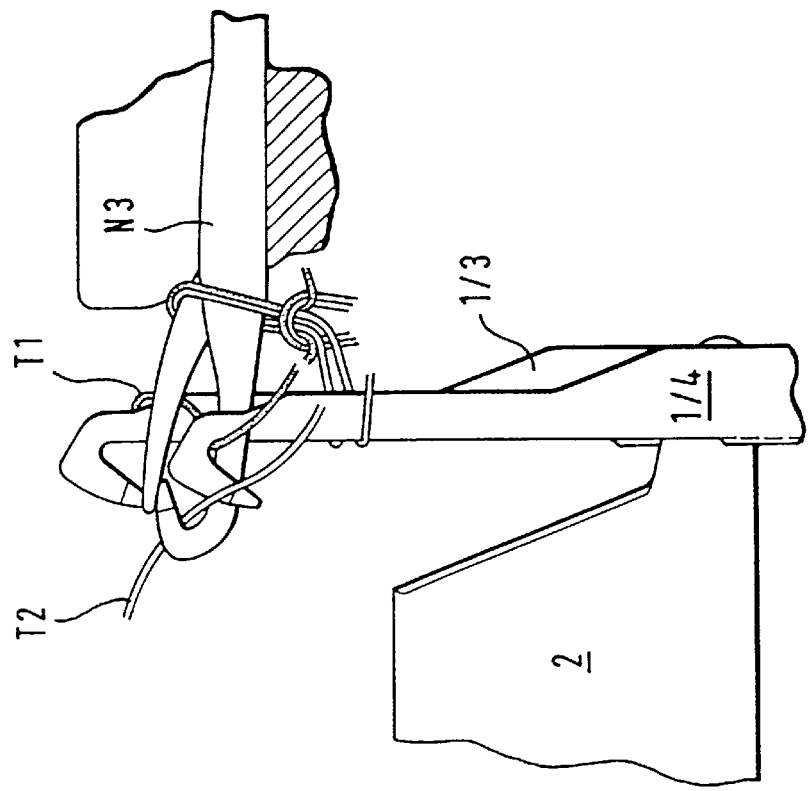
Figure 18:
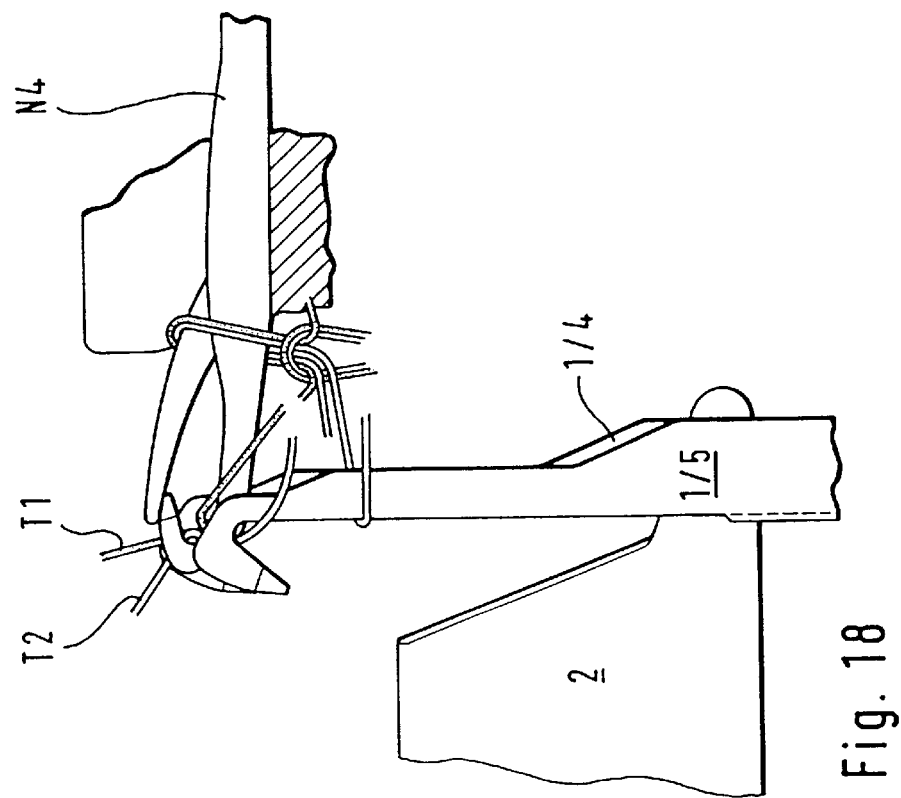

At the same time the pile elements which have engaged the first pile yarn T1 (1/2; 1/4 in FIGS. 8a and 8b) are slightly retracted to avoid an engagement of the second pile yarn T2 (FIG. 17) and to secure that pile yarn T2 can slide overhead the pile elements (1/2; 1/4) controlling the first pile yarn T1 (FIG. 18).

Figure 19:
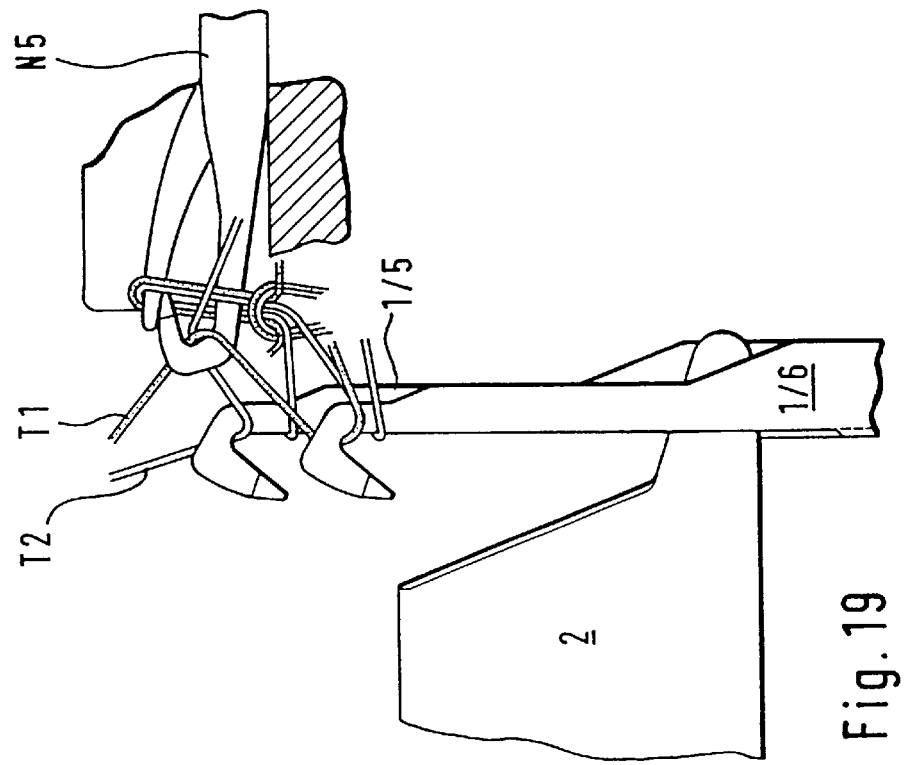
Figure 21:
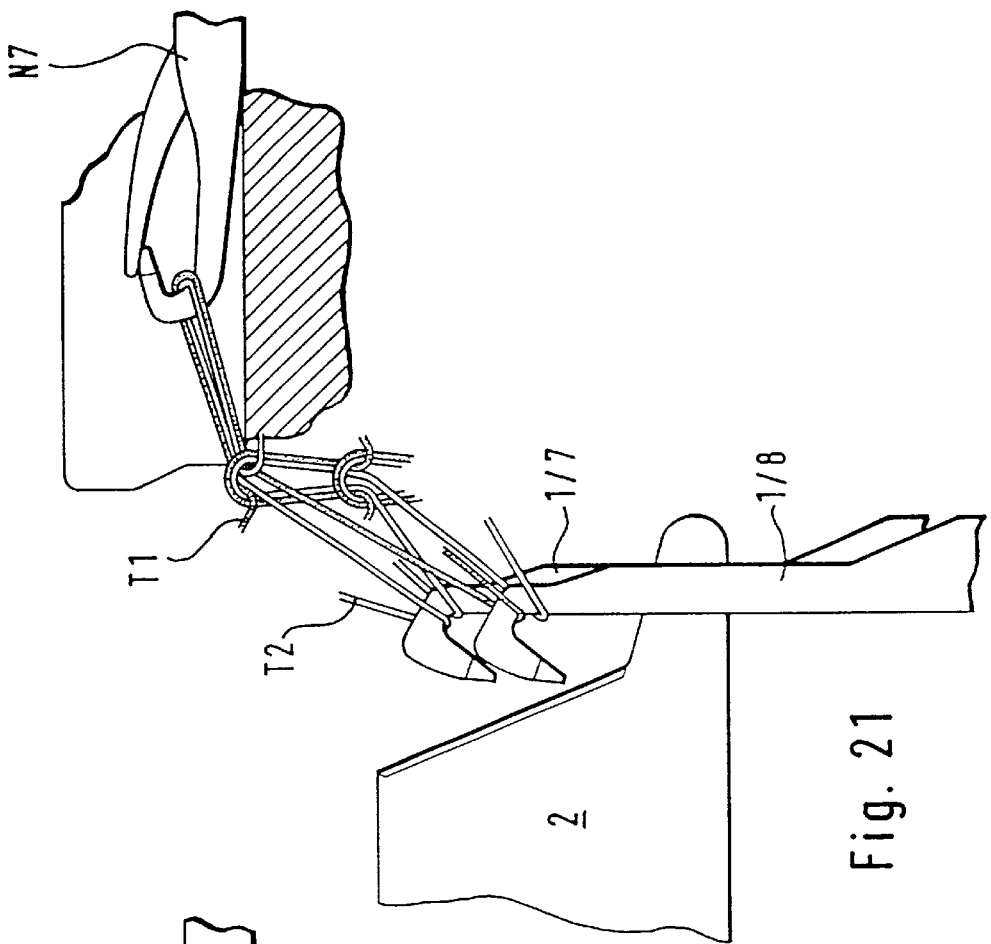
Figure 20:
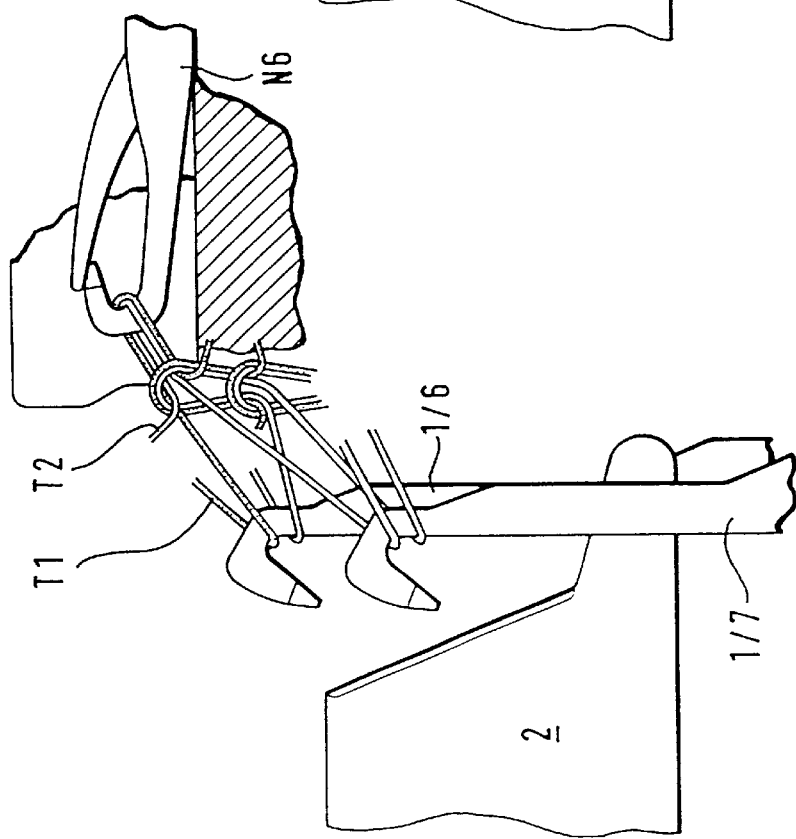

When the needles have passed the pile elements (subsequent from needle N5 in FIG. 8a) the tracks P1 and P2 are united to track 1T and needles and pile elements are collectively retracted for stitch and pile forming (see, FIGS. 19, 20 and 21).

With the retracting of the pile elements 1 it is possible to adjust the pile length according to the retracting position. On the other hand by the retraction of the pile elements into the pile forming position the relevant pile yarn is controlled to the inside of the needle hooks (see FIG. 19) and a reverse plating effect will result. To obtain a regular plating the pile elements are actuated corresponding to the tracks P11 and P12, which will continue tracks P1 and P2 when the needles have passed the pile elements (see, FIG. 7, and FIGS. 9a and 9b).

Referring to FIGS. 9a and 9b the needles N1–N8 are actuated identically as in FIGS. 8a and 8b. In contrast with that previous description, the pile elements 1/11–1/18 are controlled or selected in alternative positions, from pile elements 1/1–1/8 in FIG. 8b, to produce different effects, with pile elements 1/11, 1/13, 1/15 and 1/17 positioned to engage the first pile yarn T1. Therefore, the treatment of the pile yarns and their separation is as referred to above.

Figure 22:
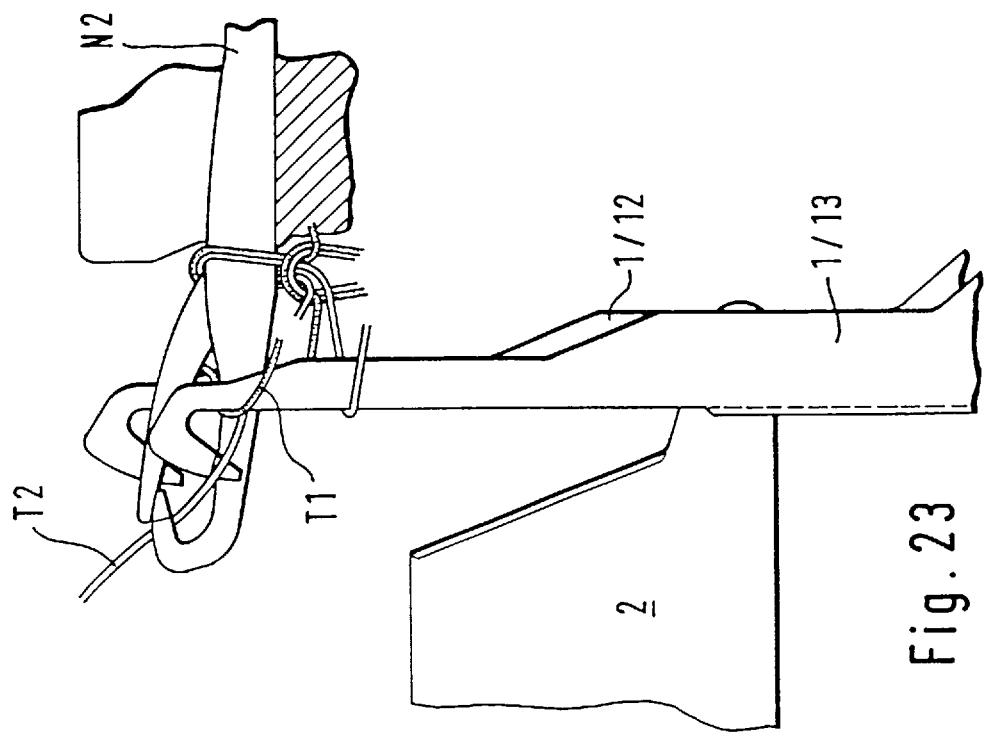
FIGS. 22 to 27 are the side views to the alternative control of pile elements cooperating with the needles N1 to N6 in FIGS. 9*a* and 9*b*.
Figure 23:
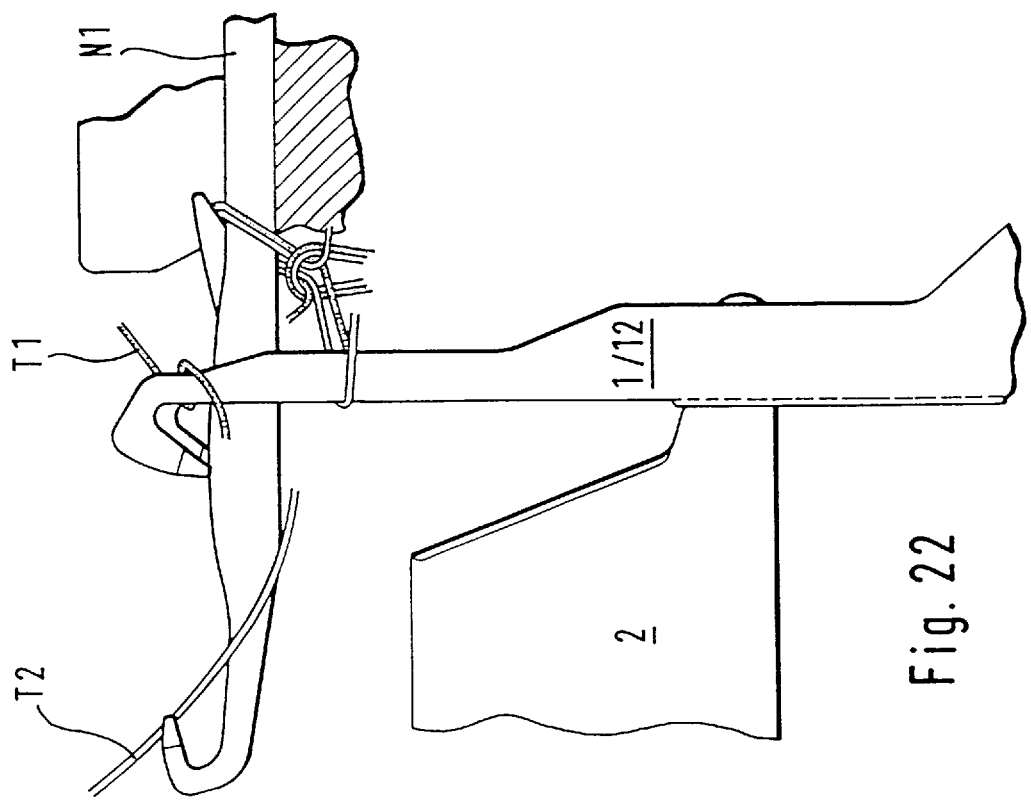

When the second pile yarn T2 approaches the pile elements with needle N1 (FIG. 22) pile element 1/12 starts to raise for engaging the second pile yarn T2. Thereby the peak of this pile element will penetrate through the needles in front of the first pile yarn T1 and will shift this pile yarn T1 with the positioning ledge 1S onto the back of pile element 1/12. The position of pile element 1/13, this element controlling the first pile yarn T1 in its hook, is slightly retracted (as shown in FIG. 23) so that the second pile yarn T2 is prevented from entering the hook of pile element 1/13.

Figure 25:
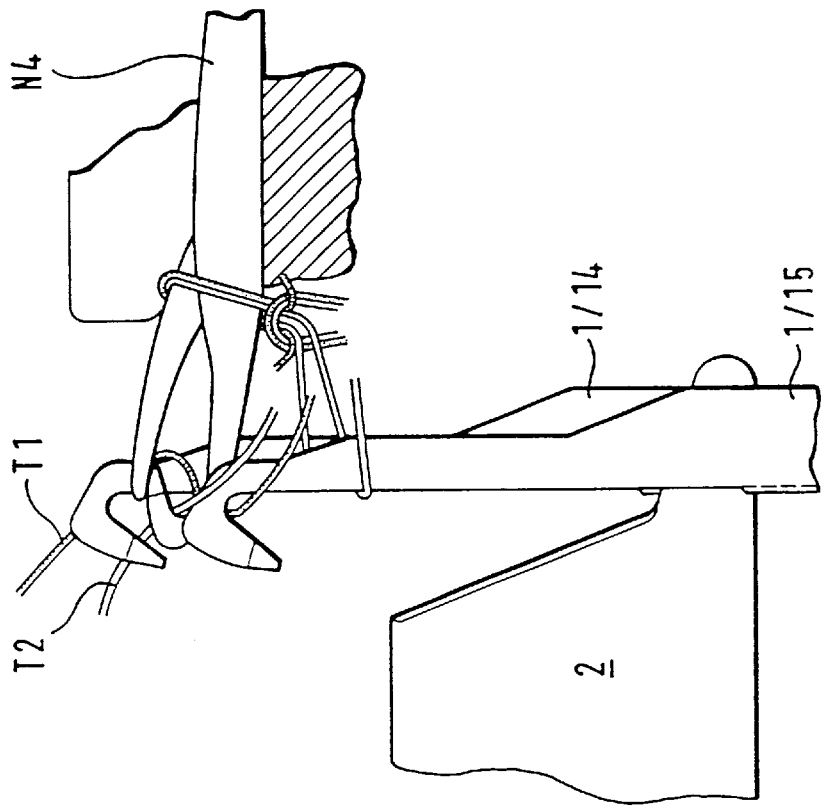
Figure 24:
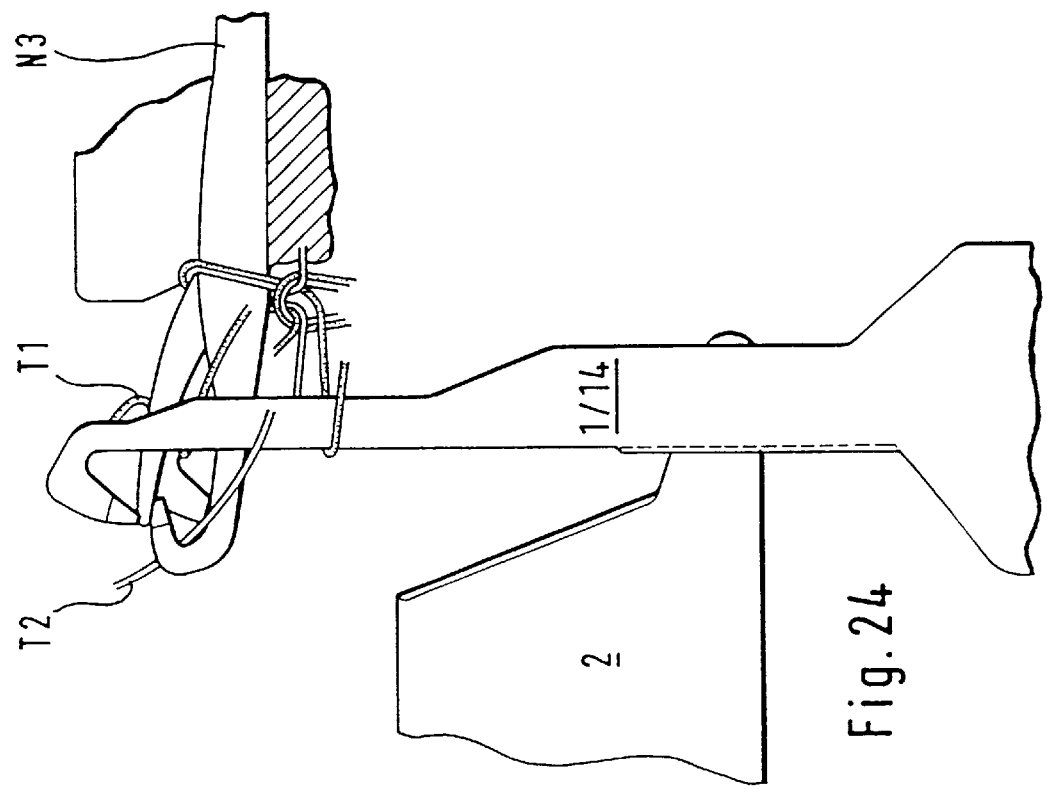
Figure 27:
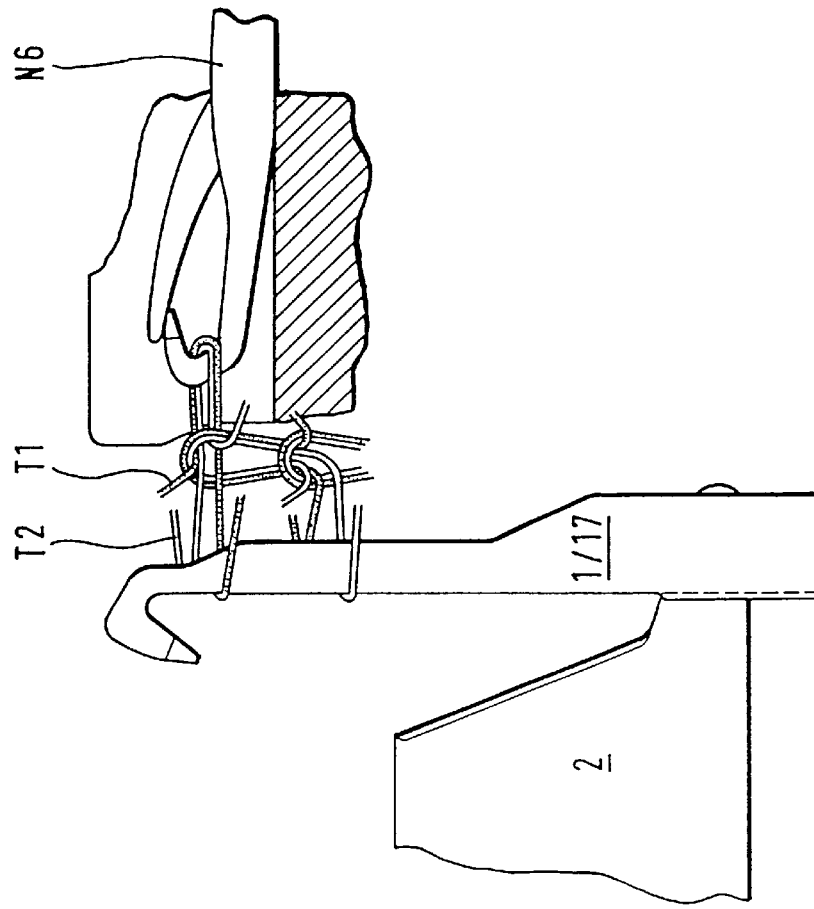

The position of pile element 1/14 is arranged to engage the second pile yarn T2 ( FIG. 24) while according to FIG. 25 the hook of needle N4 passes the pile elements by which the second pile yarn T2 is drawn to the pile element 1/14 and is controlled overhead by pile element 1/15 which has engaged the first pile yarn T1.

In contrast to the control of the pile elements corresponding to FIG. 8a and 8b, in the present embodiment has the pile elements which have engaged the second pile yarn T2 remain in their raised position to which the other pile elements are now actuated.

Figure 26:
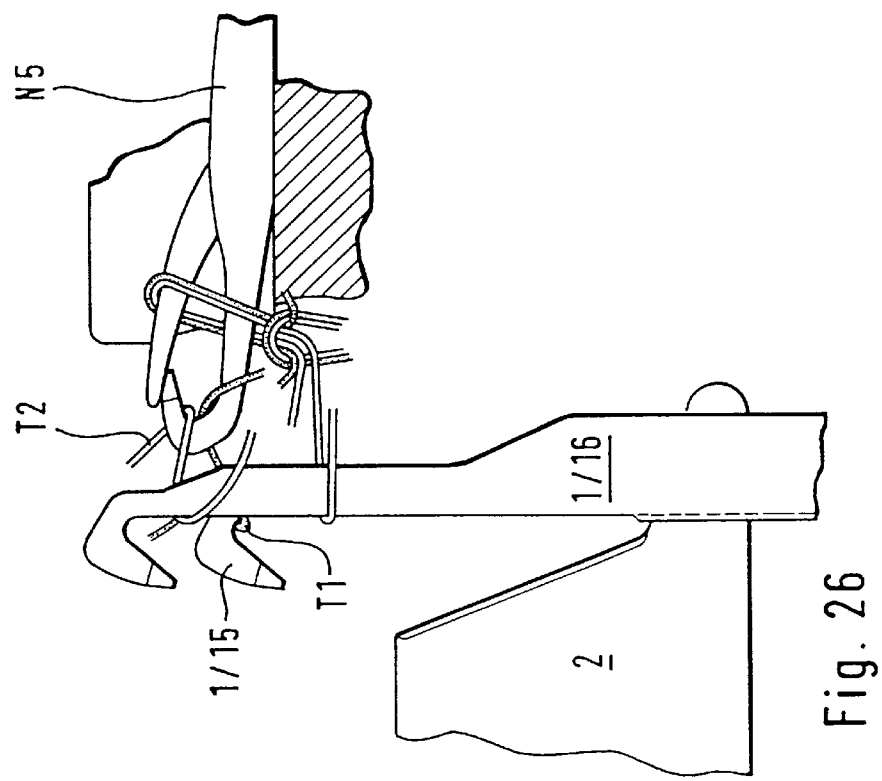

According to FIG. 26 pile element 1/15 starts to raise up to the position of pile element 1/16 which has engaged the second pile yarn T2. All pile elements, beginning with pile e;e,emt 1/17, that are not designated to engage the second pile yarn T2 are raised to a collective position in which the pile loops from the pile yarns are drawn out along the longitudinal axis of the needles. This occurs when the hooks of the needles have passed the pile elements according to track P11 . By this action the looping portions of the yarns contact the innermost position of the needle hooks while regular (pile missing) portions of the yarns will contact the knitting ledge Dk of the dial which will arrange these portions inside of the needle hooks for regular plating.

As is visible from the top views of FIG. 8a and 9a, the needles N6 to N8 will knit stitches from both pile forming yarns whereby regular sinker loops (of a ground fabric portion) from one of the yarns on the dial ledge Dk are arranged, when the other yarn is drawn out to pile loops, on the selected pile element.

Theoretically, under this condition a ground fabric knitted exclusively from an additional ground yarn is not required. In practice, a pile fabric exclusively manufactured from two pile yarn, in which the alternation from a portion of pile loops of one yarn to a portion from the other yarn is realized in a stitch from which each pile yarn is protruding with a pile shank, will not have always the required solidity especially when exclusively arranged corresponding to the above described embodiment.

To improve the solidity of such a fabric use of an additional ground yarn is recommended. In patterned pile fabrics an additional ground yarn is not required, when on the alternation of different pile sections at least one sinker loop from both yarns is provided which will ensure a sufficient solidity of the fabric.

A fabric construction resulting from the above described procedure is characterized by full pile density, with each stitch having a protruding pile, and an increased solidity of the meshed pile in which the pile shanks of a pile forming yarn are protruding from adjacent stitches connected by a regular sinker loop as evident from the arrangement of the yarns in FIG. 8a and 9a between the needles N6 to N8.

As is also evident from FIG. 8a and FIG. 9a only in the illustrated arrangement of alternately pile forming from two yarns, the first pile yarn is arranged in a section of three needles (N2 to N4) in a wave like manner in front of and, respectively, behind the pile elements. The resulting tensioning of the first pile yarn for knitting and pile forming is negligible and is nullified by each other selection or alteration of the needles.

Again it is demonstratively indicated that the separation of the pile yarns for loop forming and the unaffected feeding of the yarns to the pile forming action is the essential part of this invention.

Resulting from the foregoing description of fabric construction it is obvious that in knitting with three yarns restrictions are avoided.

When knitting with three pile forming yarns the procedure of handling the second and third pile forming yarn is identical according to the treatment of first and second pile forming yarn in the above described embodiment. Therefore, it is required that the first pile yarn is arranged in a way in which it is not affected from the actions of pile elements engaging the second and third pile forming yarn.

Figure 28A:
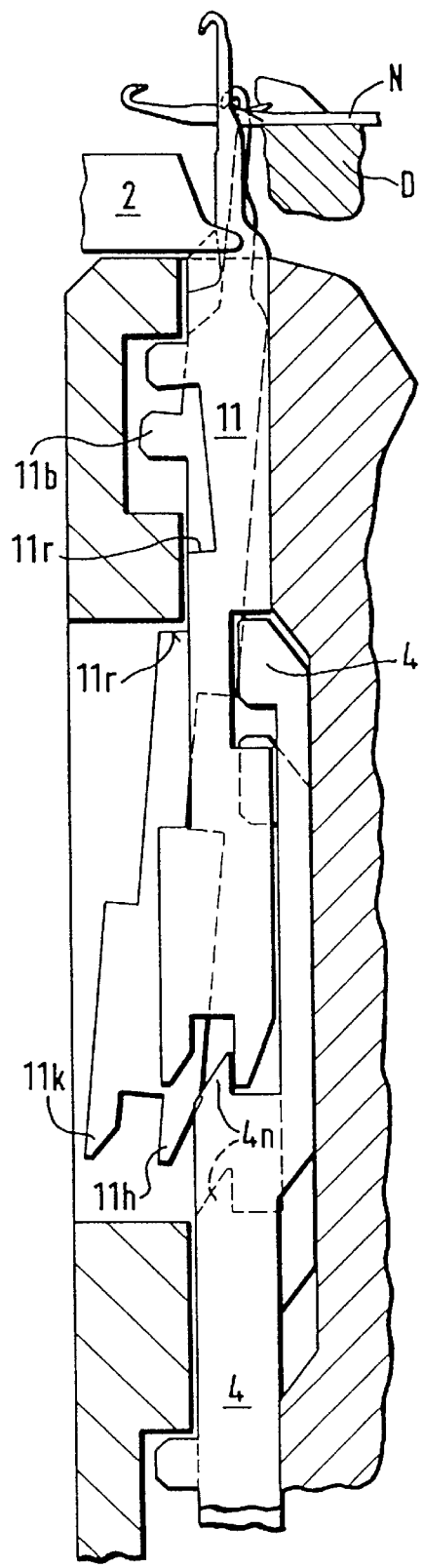
FIG. 28*a* is a simplified schematic upper cross section of a circular knitting machine for manufacturing a novel pile fabric from three pile forming yarns and severing the pile loops in the knitting machine.
Figure 29:
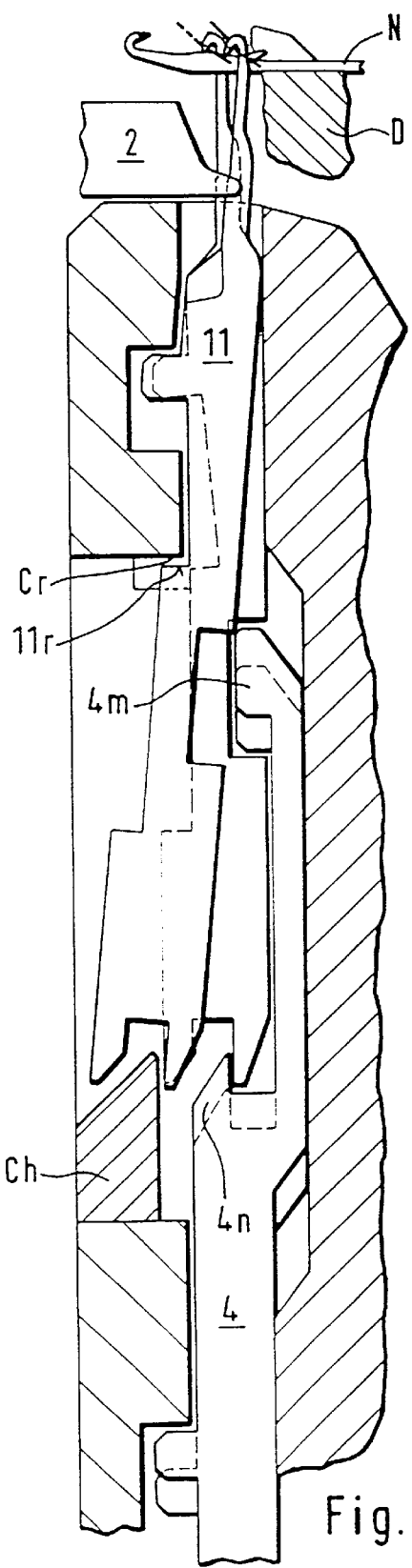
FIG. 29 is also a simplified schematic cross section of R knitting machine according to FIG. 28*a*, showing the pile elements after feeding the second pile yarn.

The requirements for an unaffected movement of the first pile yarn from the feeding to the stitch and pile forming action is visible from FIGS. 28a and 29. The pivotable pile element 11 is moved with the first pile yarn towards the dial D and will move behind the backs of all remaining pile elements.

Figure 28B:
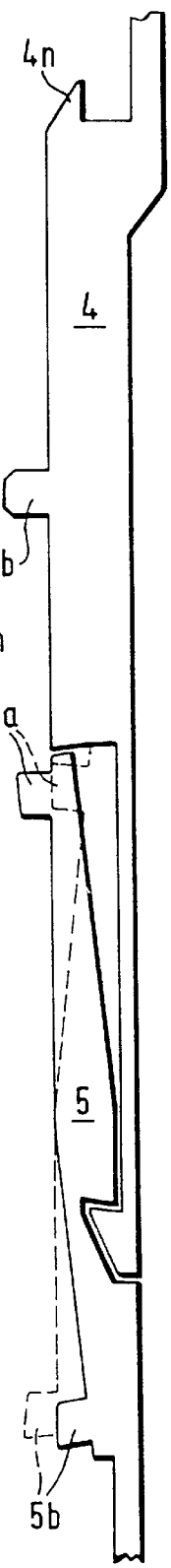
FIG. 28*b* is the simplified schematic lower cross section to FIG. 28*a* showing the means for selecting the pile elements.

Referring to FIG. 28a and 28b the pile element 11 is linked with an intermediate jack 4, with neb 4m arranged in a recess of the pile element 11. The intermediate jacks are actuated collectively by butt 4b or individually from control jacks 5 which are arranged and acting with butts 5a and 5b corresponding to the foregoing embodiment.

The nebs 11h and 11k cooperate with the neb 4n on the intermediate jack, respectively, with guiding cam Ch.

Figure 30:
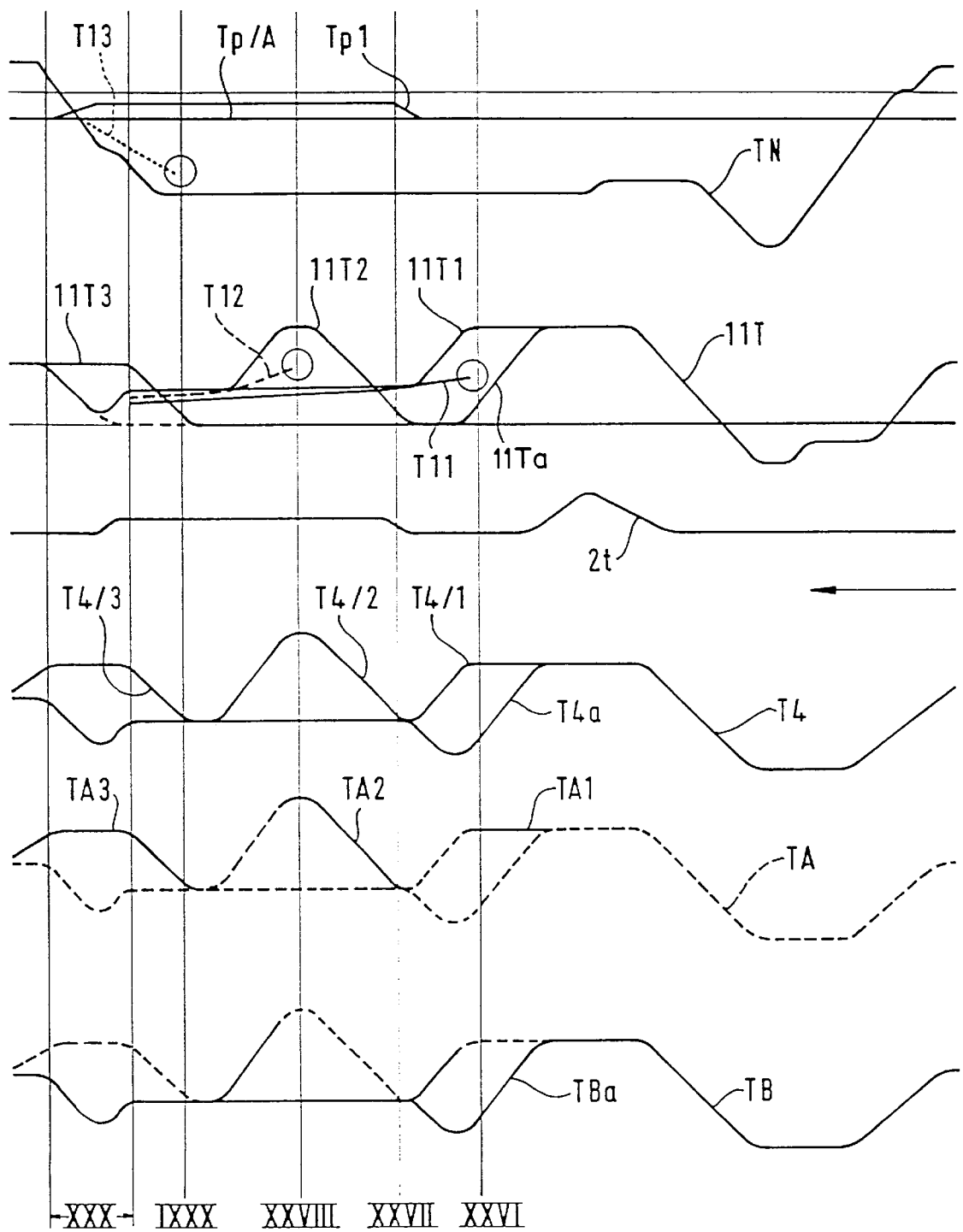
FIG. 30 is a diagram showing the trucks of needles, pile and cutting elements and butts of intermediate and control-jacks in relation to each other in order to manufacture a pile fabric from three pile yarns.

FIG. 30 illustrates the movement of the needles by track TN (seen from the top) and the horizontal (waving) movement of the pile elements in the tracks Tpl (pivoted) and Tp/A (vertical).

Also from the top the movement of cutting elements is shown and their track is indicated by 2t.

From the front are shown in FIG. 30 the tracks of pile elements, and the intermediate and control jacks.

Track 11T represents the movement of the pile elements and is divided, corresponding to the process, into the tracks 11Ta, 11T1, 11T2 and 11T3. The track of the butts 4b of the intermediate jack 4 is shown in the tracks T4, T4a, T4/1, r4/2 and T4/3.

The butts 5a of the control jacks 5 are moving according to he tracks TA, TA1, TA/2 and TA/3, corresponding in opposite disposition, and the butts 5b are moving according to tracks TB and UBa. Full lines on tracks TA or TB represent projecting butts, dash lines representing depressed butts which are moving indirectly by movements actuated on the other butt or from butt 4b of the intermediate jack.

The knitting process in this embodiment starts identically with the above described process. The needles are raised to the clearing position and the pile elements are retracted to tensioning the pile loops (compare FIG. 10). Thereafter, the needles are retracted to a feeding position and the pile elements are raised to a cutting position (compare FIG. 11) in which they will remain nearby to the end of the cutting action (compare FIG. 12) of the cutting elements.

Figure 31:
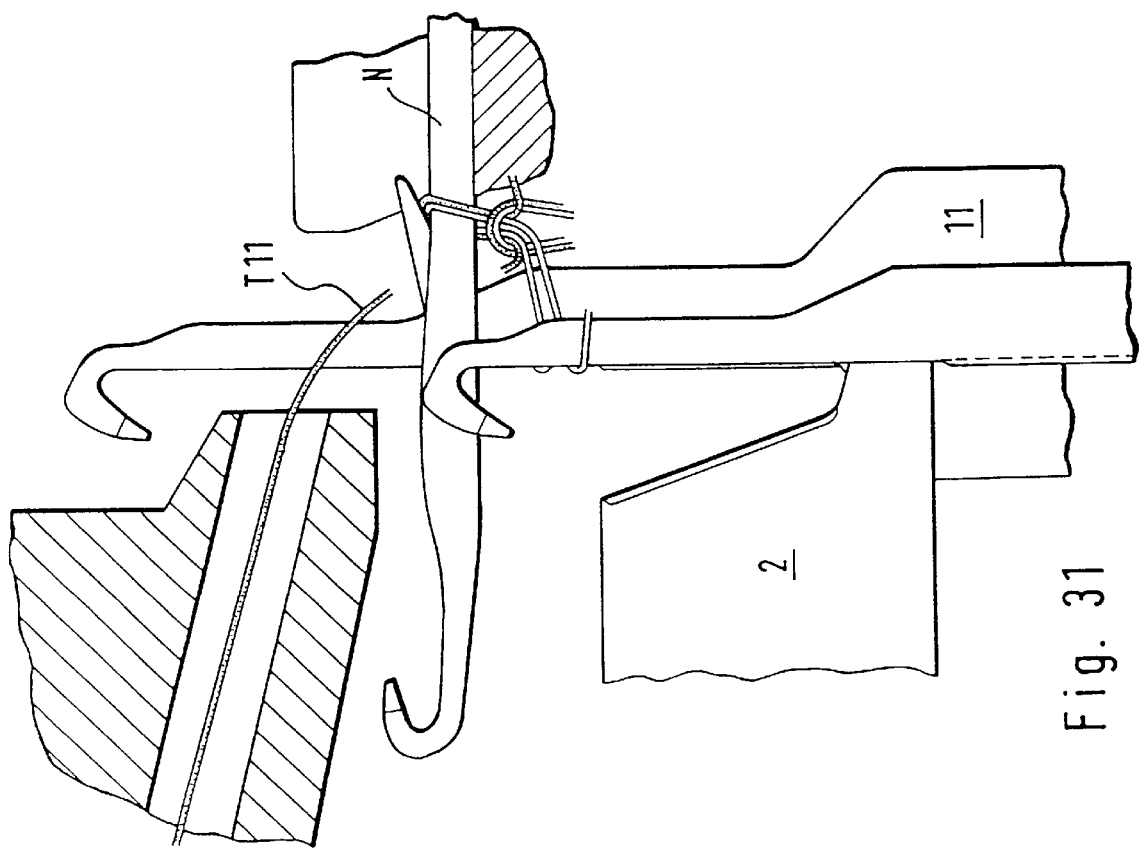

Simultaneously to the cutting action the control jacks are reset and divided. A cam acting now on butts 5b will retract intermediate jack 4 and the corresponding pile elements to an idle position according to the tracks TBa, T4a and 11Ta in which the peaks of the pile elements are arranged in line or below the cheeks of the needles (FIG. 31) while the other pile elements remain in a feeding position (track 11T1) to engage a first pile yarn T11 which is fed in position XXVI of FIG. 30 and shown also in FIG. 31.

After feeding yarn T11 the raised pile elements are retracted on butts 4b to an intermediate position according to tracks T4/1 and 11T1. In this action, as well as in the foregoing retraction of all pile elements missing the first pile yarn T11, the nebs 11h of the pile element and nebs 4n of the intermediate jacks 4 are not in contact with one another and are not linked together, as is shown by the dashed lines in FIGS. 28a and 29. By raising the previous retracted intermediate jacks (T4a) the nebs 4n will overlap the nebs 11h of the pile element and Will control this elements in vertical position.

Simultaneously with the retraction of the pile elements with the first pile yarn the control jacks are reset and divided for subsequent action.

Figure 32:
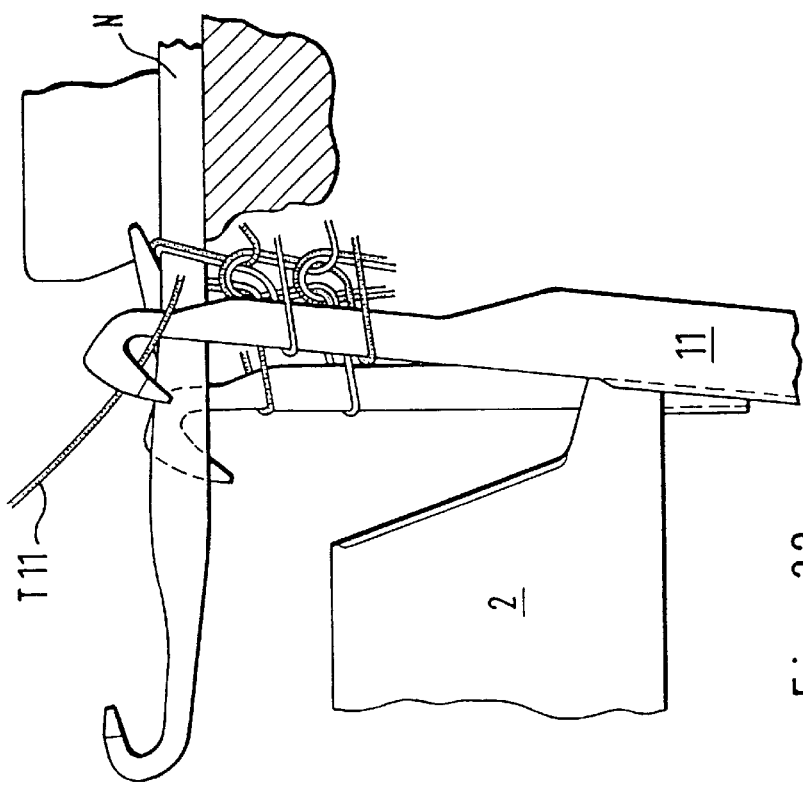
FIGS. 31 to 34 are side views to the needles and pile elements arranged according to the positions indicated by XXVI to IXXX.

When the pile elements, with pile yarn T11, have nearly approached their intermediate position according to position XXVII in FIG. 30, the cutting elements are slightly moved towards to the dial. Their compression against the pile elements moves the pile elements which have engaged the first pile yarn, and which are not controlled in vertical position by the overlapping nebs 11h and 4n, also towards to the dial, so that the first pile yarn is further on moving unattached to the pile forming and knitting action between upright and pivoted pile elements (FIG. 32).

Figure 34:
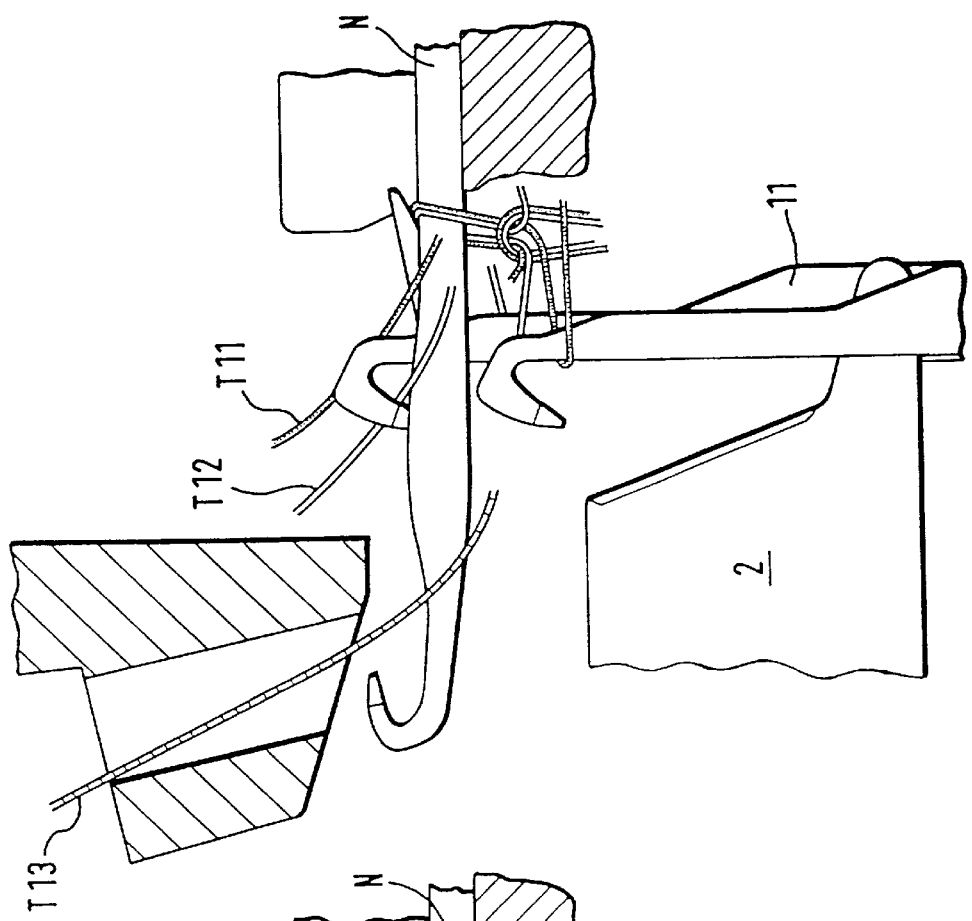
Figure 33:
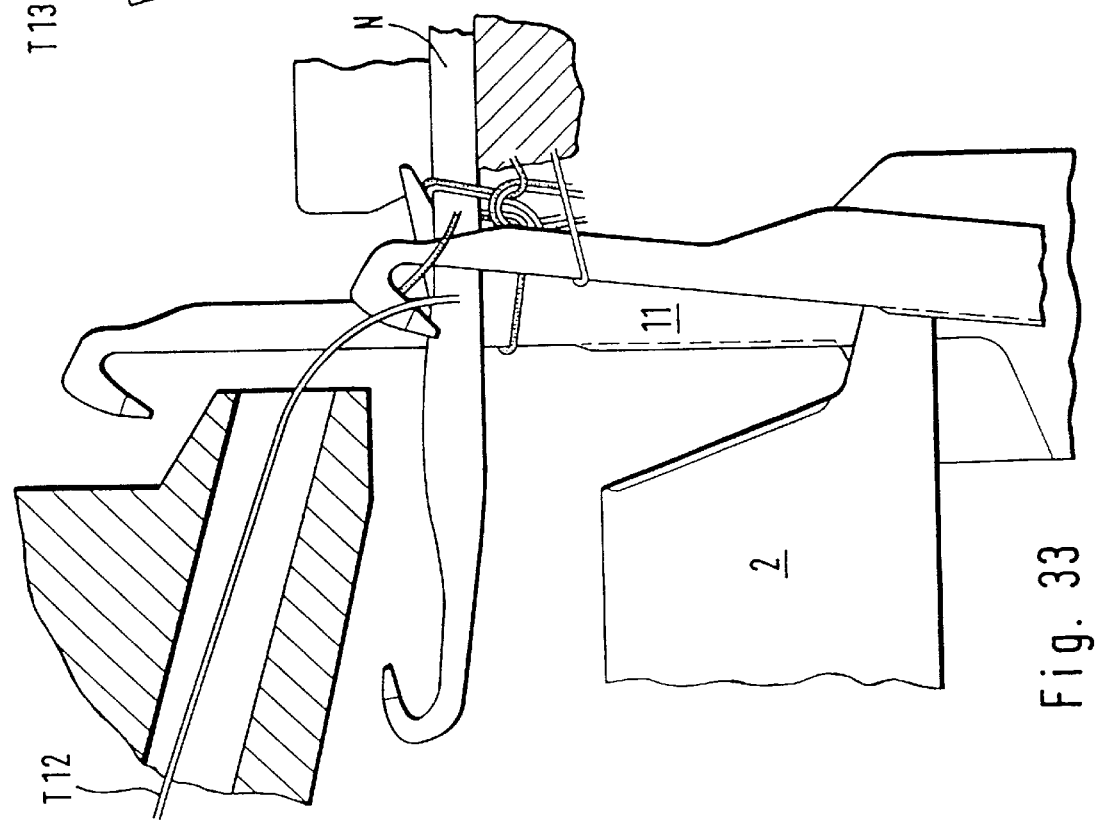

Subsequently predetermined pile elements are raised by a cam acting on butts 5a according to tracks TA/2, T4/2 and 11T2 into a feeding position (position XXVII in FIG. 30) and after feeding a second pile yarn T12 (FIG. 33) these pile elements are retracted to an intermediate position by a cam acting on the butts 11b of the pile elements "by which the overlapping arrangement of nebs 4n and 11h remains. Additionally, the holding cam Ch will cover neb 11k of the pile elements 11 which have not engaged the first pile yarn T11 (FIG. 29). As illustrated in FIGS. 29 and 34 the first and second pile yarns T11, T12 are separated and can move to the knitting and pile forming action unaffected by the previous actions.

Simultaneously with the retraction of the pile elements which have engaged the second pile yarn T12, the control jacks 5 are reset and divided for engaging a third pile yarn T13. The pile yarn T13 is fed immediately prior to the retraction of the needles at position IXXX in FIG. 30 so that the pile yarn T13 is quickly engaged by the needle hooks and controlled towards the dial.

Figure 35A:
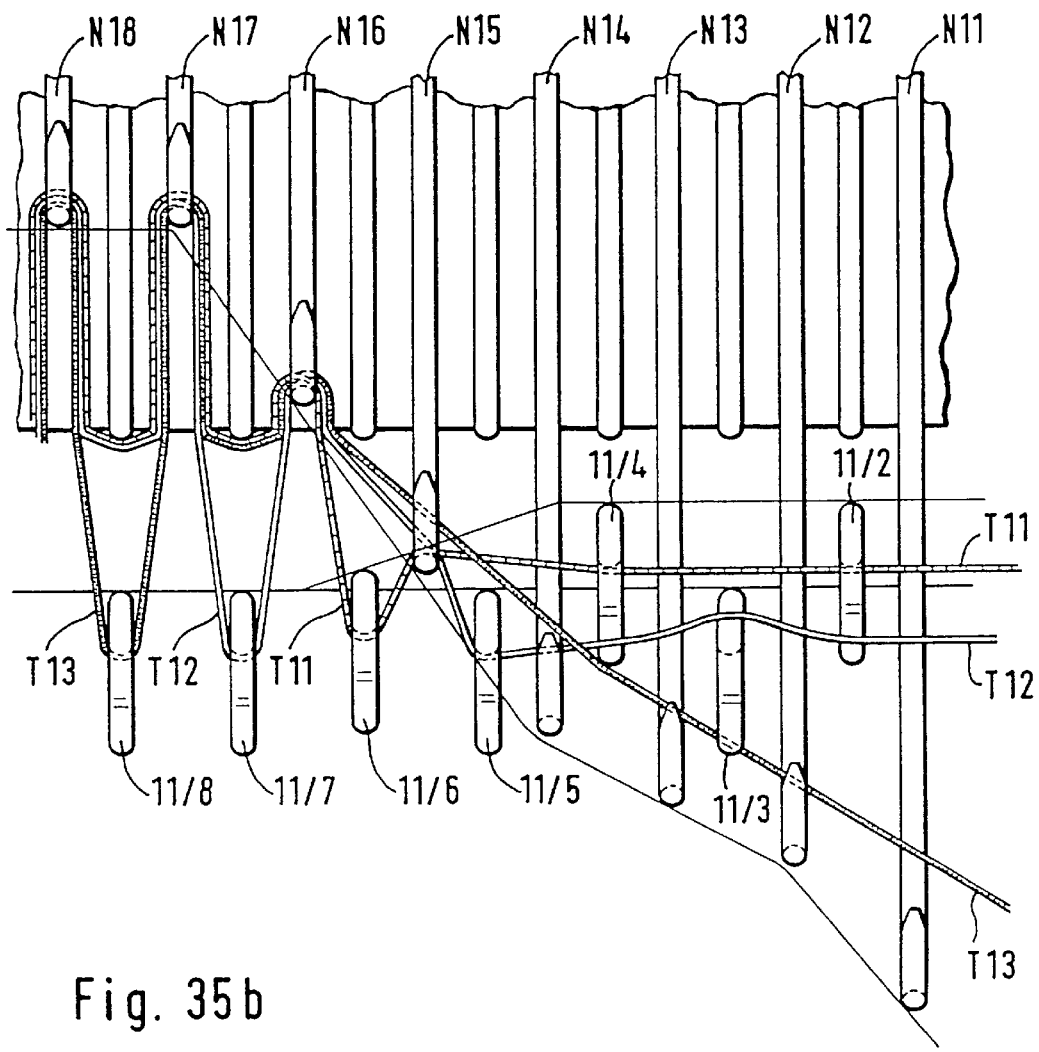
FIG. 35*a* is a view from the top to the stitch forming section indicated with XXX in FIG. 30.
Figure 35B:
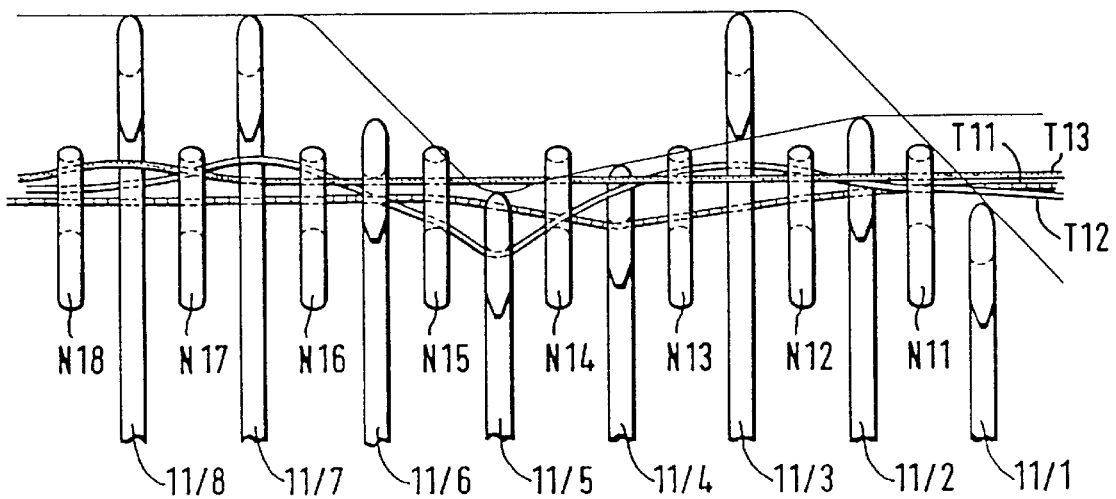
FIG. 35*b* is a front view to the same section.
Figure 37:
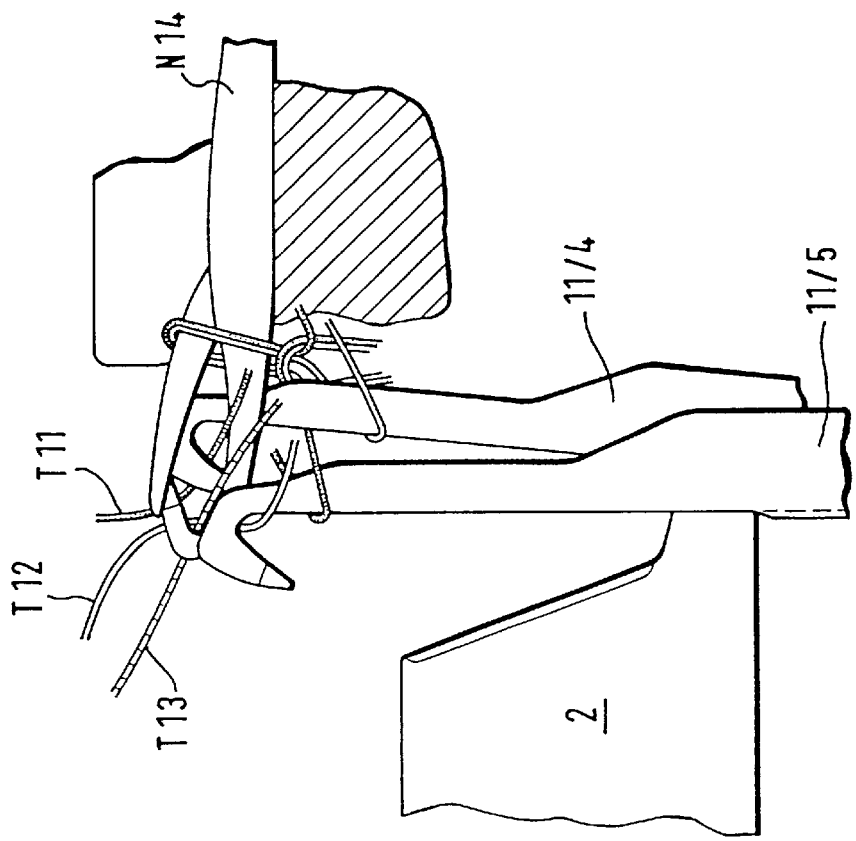
FIGS. 36 to 39 are side views to each of the needles N13 to N16 in cooperation with the adjacent pile elements according to FIG. 35*a* and 35*b*.

The pile forming and knitting action is illustrated in detail corresponding to section XXX in FIG. 35a where the needles and pile elements are shown from the top, and in FIG. 35b where the same portion is shown from the front. Additional side views of needles N13 to N16, that are cooperating with the pile elements, are shown in FIGS. 36 to 39.

Figure 36:
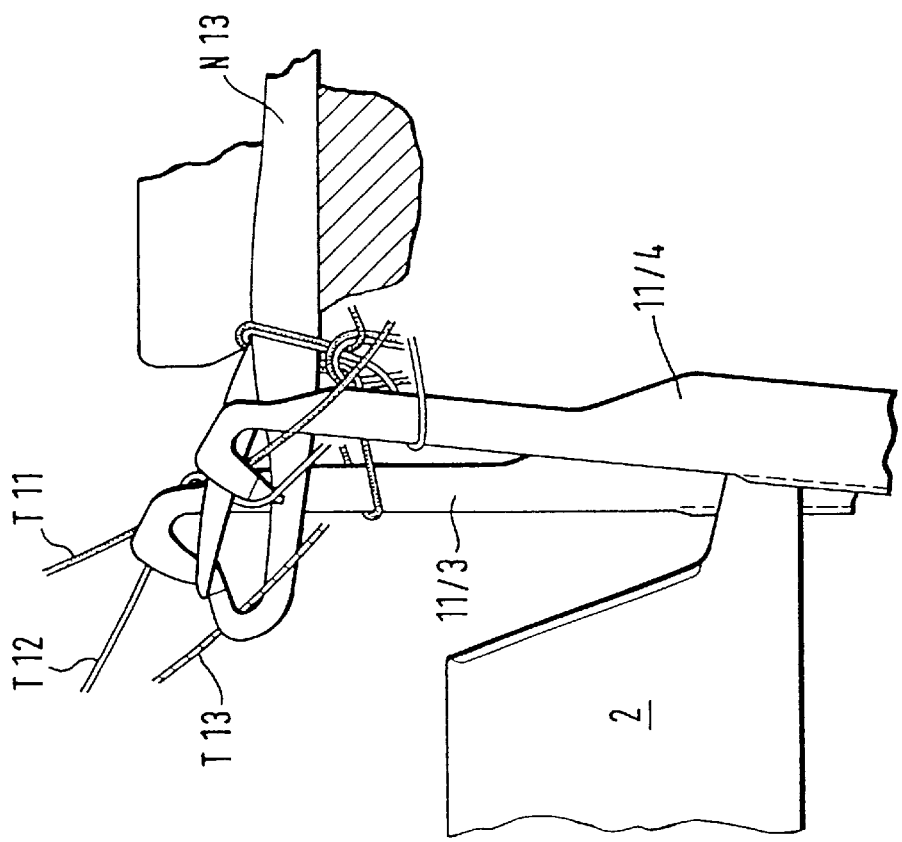

According to track TA/3 selected control jacks 5 with the cooperating intermediate jacks 4 and pile elements are raised from their idle position to an engaging position as illustrated by pile element 11/3 in FIGS. 35a, 35b and 36. By this movement pile yarn T12 is arranged on the backs of pile element 11/3 for a distance or space of up to three needles.

If the pile elements are provided to alternatively engage the second and third pile yarns, the second pile yarn is arranged in a wave-like manner as described in earlier embodiments.

At the same time pile elements with the first pile yarn T11 and second pile yarn T12 are slightly retracted (pile elements 11/4 and 11/5 in FIG. 35a, 35b and 36) so that the yarn portions of pile yarn T13 not engaged by pile elements will pass with the needle hooks overhead of these pile elements. Also, yarn portions from pile yarn T12 not engaged from pile elements will pass overhead of pile elements which have engaged the first pile yarn T11.

When the needle hooks have passed the pile elements the pile elements with the first pile yarn T11 (pile element 11/6 in FIGS. 35a, 35b and 38) is moved back into vertical position, supported by an outward movement of the cutting elements (see track Tp1 FIG. 25). Simultaneously, the pile elements which have not engaged the third pile yarn T13 are raised by the butts of the pile elements, so that pile forming is realized along the longitudinal axis of the needles to perform a correct plating.

It is self-evident from the first embodiment that also the pile elements can be retracted for pile forming by which a reverse plating will result.

The movement of pile elements which have engaged the first pile yarn is illustrated in FIGS. 40 to 43.

Figure 41:
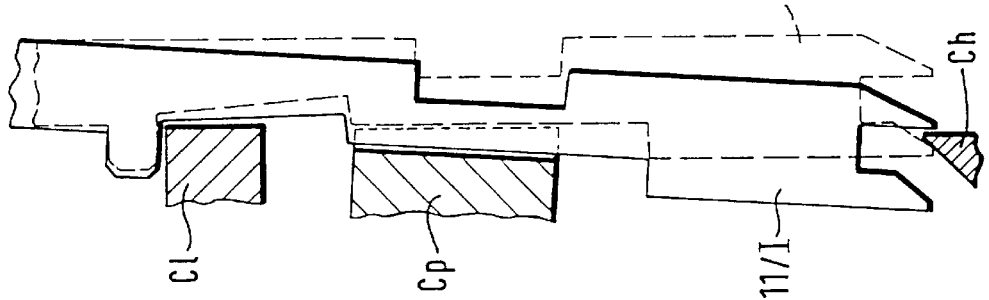
Figure 40:
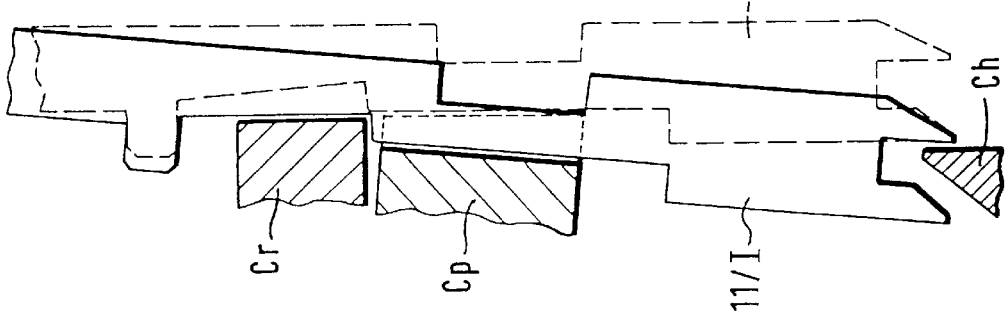

The retracting of pile element 11/I, which engaged the first pile yarn T11 in section XXX of FIG. 30, is realized by retracting cam Cr, acting on the protruding ledge 11r of the pile element (FIG. 29). Pile elements 11/II which have engaged the second pile yarn T12 or will miss all pile yarns are retracted by butts 5b (FIG. 30). They are controlled in vertical position by holding cam Ch (FIGS. 40, 41).

Figure 43:
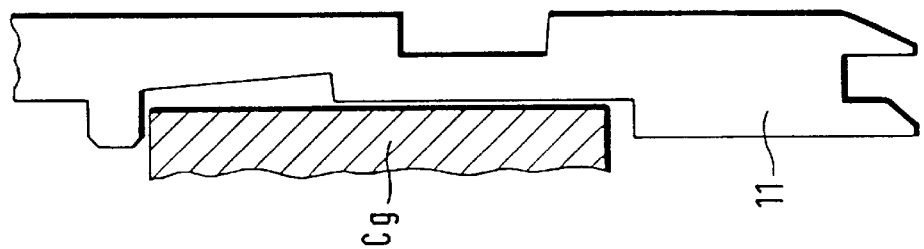
FIGS. 40 to 43 is a side view to the lower part of the pivotable pile element to demonstrate the control of the pile elements during the stitch forming section.
Figure 42:
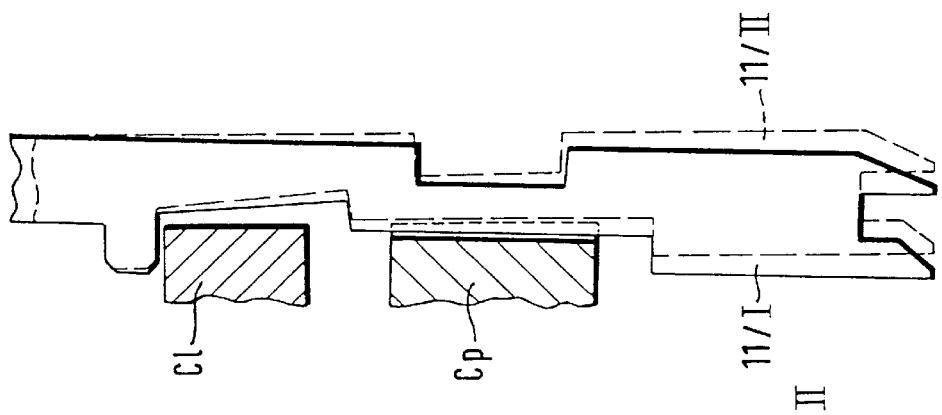

Simultaneously with the raising of previously retracted pile elements 11/I and 11/II by raising cam C1 a presser cam Cp will act on the protruding parts of the moved pile elements 11/I (FIGS. 40–42), so that they are in vertical position when the stitch forming action is initiated in which all pile elements 11 are controlled by cam Cg (FIG. 43).

From the description of all embodiments above it is obvious that the present invention provides an excellent approach for manufacturing velour-type fabrics by association of the proposals for severing pile loops according to EP-A2-0 0082 and German patent application 195 18 490.4.

Nevertheless pile fabrics with regular loop structure can also be manufactured. This is realized by additional use of well known proposals.

As known from different methods, looped pile fabrics according to the invention are realized by arranging a latch on the above described pile elements. The latches are opened Dn the beginning of a knitting cycle and thereafter in an additional section the pile elements are raised, the pile loops are cleared from the latches and after retraction of the pile elements the pile loops are cleared from the pile elements (note, for example, German Patent Application 27 04 295).

To avoid additional movement of the pile elements for clearing pile loops it is also possible to use pile elements with hooks positioned toward the dial, for example, as proposed in U.S. Pat. No. 4,043,151. For realization of the present invention such elements must be modified and improved as described in the following embodiments.

Figure 44:
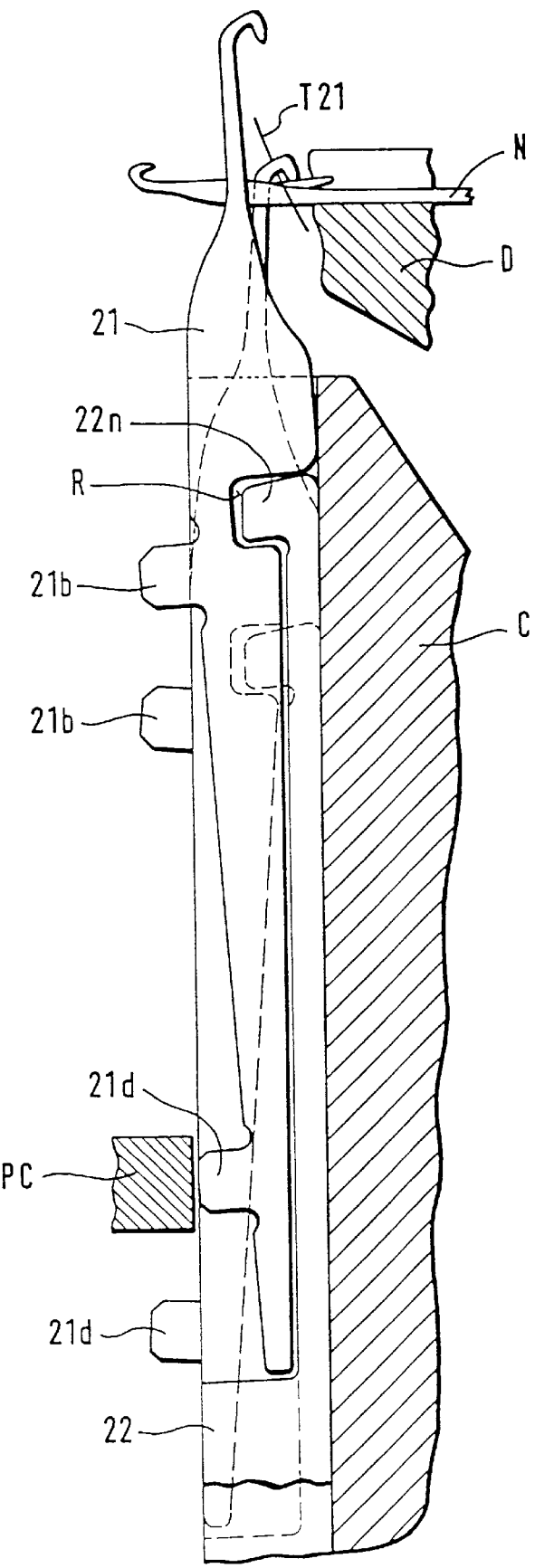
FIG. 44 is a simplified schematic cross-section of a circular knitting machine for manufacturing loop pile fabrics.

As illustrated in the simplified cross-section of a circular knitting machine in FIG. 44 hooked pile elements 21 are arranged in the cylinder C. The pile forming hooks are characterized by a peak positioned towards the dial in relationship to the inner arc of the hook to support the dividing and control of the pile yarns. The pile elements 21 have on their inner side a recess R cooperating with a neb 22n of intermediate jacks 22, which can actuate the pile elements in a longitudinal direction in association with a selection arrangement analogous to the illustration and description of the previous embodiment.

The complete arrangement of pile elements, intermediate jacks and control jacks is collectively controllable by butt 21b of the pile element which is additionally pivotable by butt 21d when cooperating with a presser cam PC.

The arrangement of the needles N and their movement for knitting a complete course is accomplished in a manner analogous to that described for the previous embodiments.

Figure 45:
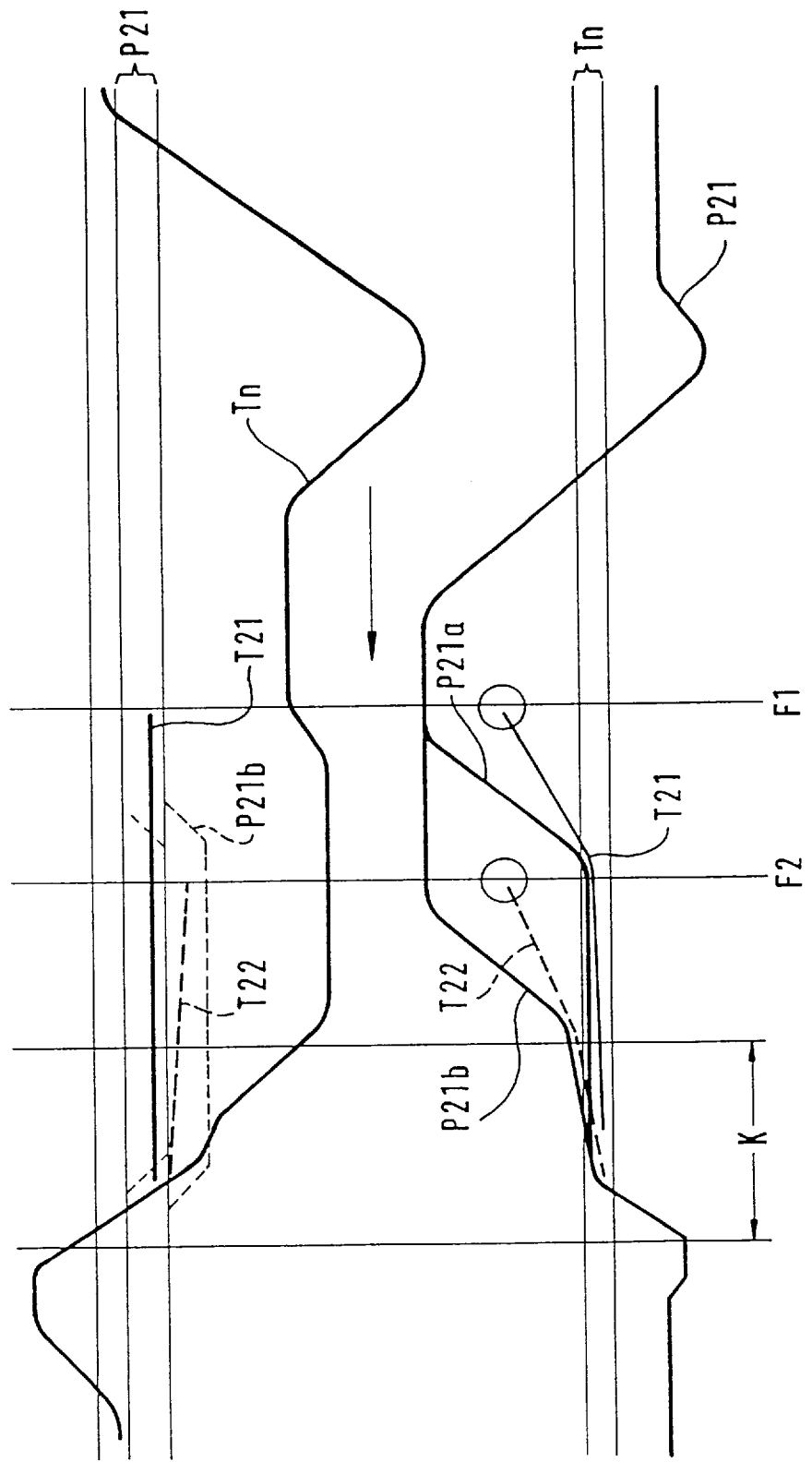
FIG. 45 is a diagram illustrating the tracks of needles and pile elements of FIG. 44 in relation to each other for knitting a complete course in a further embodiment.

In FIG. 45 the required movements of needles and pile elements for knitting a plain course with pile loops alternatively from two pile yarns is illustrated. The needles move along track Tn from the right to the left pile elements according to tracks P21, P21a and P21b respectively.

When the needles are raised to a clearing position the pile elements are arranged in an idle position. Immediately with the clearing of the stitches from the latches a stretching out of the previous knitted pile loops can be realized. Simultaneously with this action the control jacks are reset and divided.

The needles are now retracted to a feeding position and all those pile elements predetermined or selected to engage one of the two pile yarns are raised to a feeding position as indicated in FIG. 45 of F1 in which pile yarn T21 is fed (FIG. 41).

Figure 39:
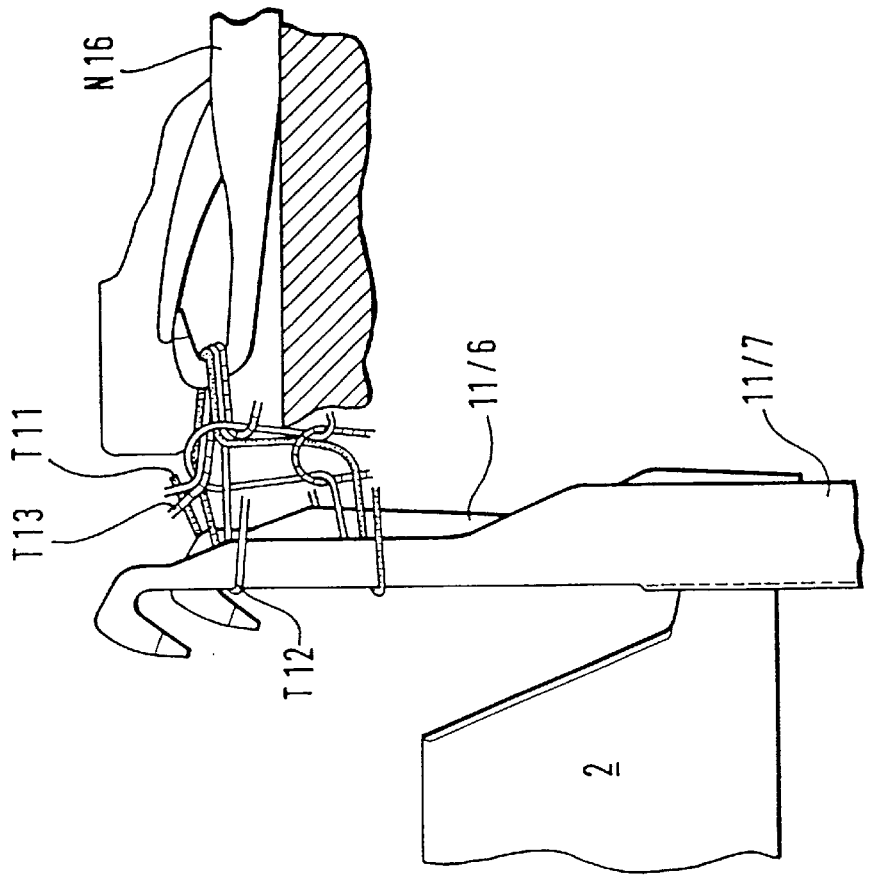
Figure 38:
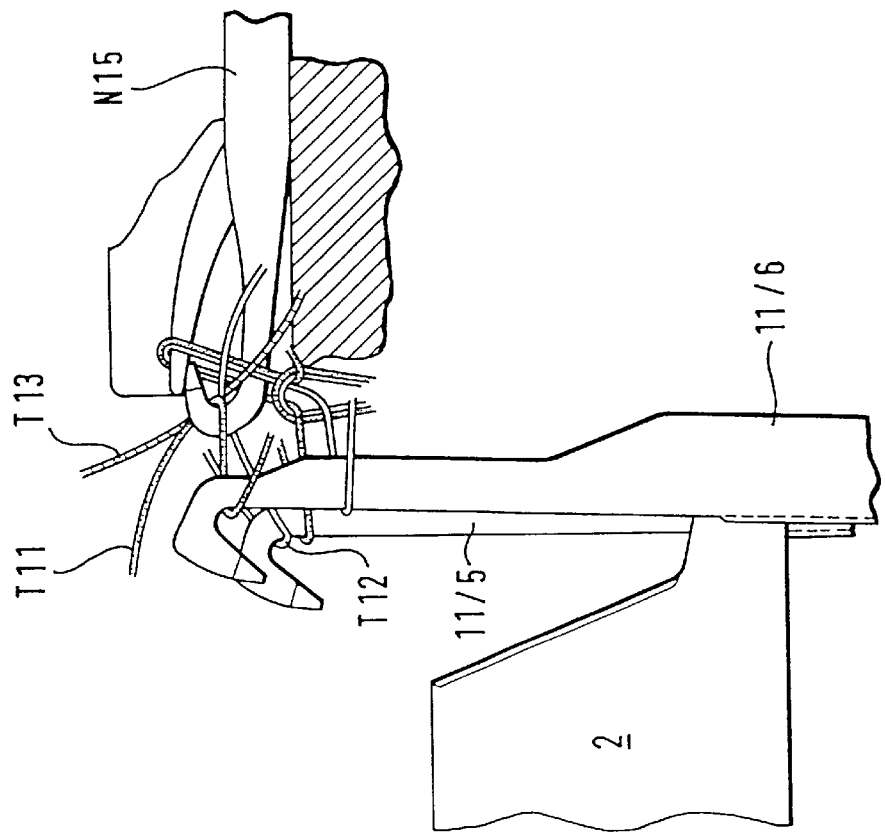

Prior to the feeding position the control jacks of the raised pile elements, respectively intermediate jacks, are divided, so that predetermined pile elements which are retracted to an intermediate position which will have engaged the first pile yarn T21 as shown in FIG. 41. The remaining pile elements are simultaneously moved outward by the action of presser cam PC operation on butts 21d (FIG. 39).

According to FIG. 47 the second pile yarn T22 is fed to the moved pile elements 21p, corresponding to position F2 in FIG. 45, whereafter also these pile elements are retracted, preferably by butts 21b, to an intermediate position as shown in FIG. 48. As illustrated therein the second pile yarn T22 is correctly arranged at the backs of the pile elements which are controlling the first pile yarn T21, which is exactly separated from the second pile yarn T22 by the pivotal movement of the predetermined pile elements 21p.

Following the positioning of the pile elements with the second pile yarn T22 the knitting and pile forming action according to section K in FIG. 45 is initiated by retracting the needles into the dial (FIG. 49). Thereby the pivoted position of pile elements with the second pile yarn T22 is nullified (FIG. 50) and a slight retraction of the pile elements will assure that yarn portions of pile yarn T22, designated to knit a regular ground fabric portion, can pass overhead of the pile elements controlling the first pile yarn T21 (as is demonstrated in FIG. 51). In cooperation with the stitch forming the pile loops alternatively from one of the pile yarns are drawn out (FIG. 47).

The pile elements can be actuated in the pile forming process according to various requirements in different variations.

When the length of the loops is adjusted by the retraction of the pile elements on butts 21b, or comparable butts on the intermediate jacks, the position of the retracting cam will specify the loop length. The same will happen if simultaneously with the loop forming action a presser cam will pivot the pile elements to a predetermined position.

The retraction of the pile elements via the cooperating intermediate and control jacks enables in addition to the alternate pile forming from two yarns the adjustment of the pile loops to two different lengths.

According to the above description the selection of the pile elements for retracting pile elements with a first pile yarn T21 will remain also for the loop forming action. With a different position of the retracting cams acting on the butts of the control jacks the loop length of each loop yarn is adjustable.

If different loop lengths from both pile yarns are requested subsequent to the retraction of pile elements with the first pile yarn, the control jacks must be reset and divided according to the predetermined length of the loops, which are realized by the different position of the retracting cams acting on the butts of the control jacks.

Figure 53:
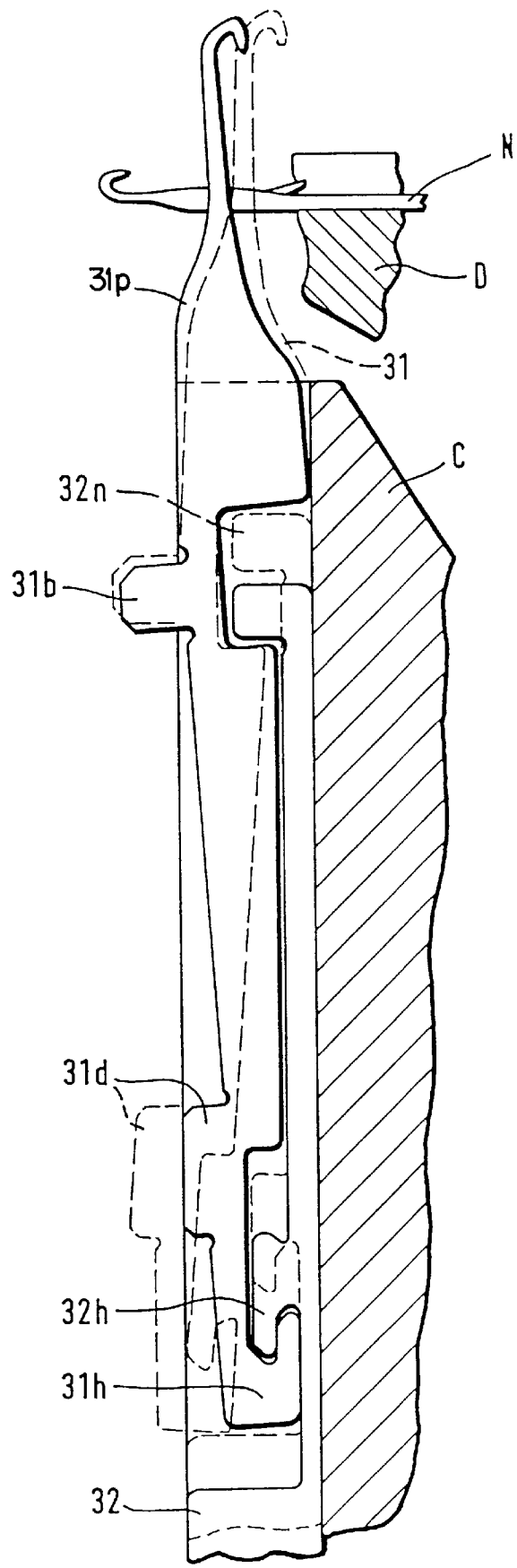
FIG. 53 is a further simplified schematic cross-section of a circular knitting machine for manufacturing loop pile fabrics.
Figure 54:
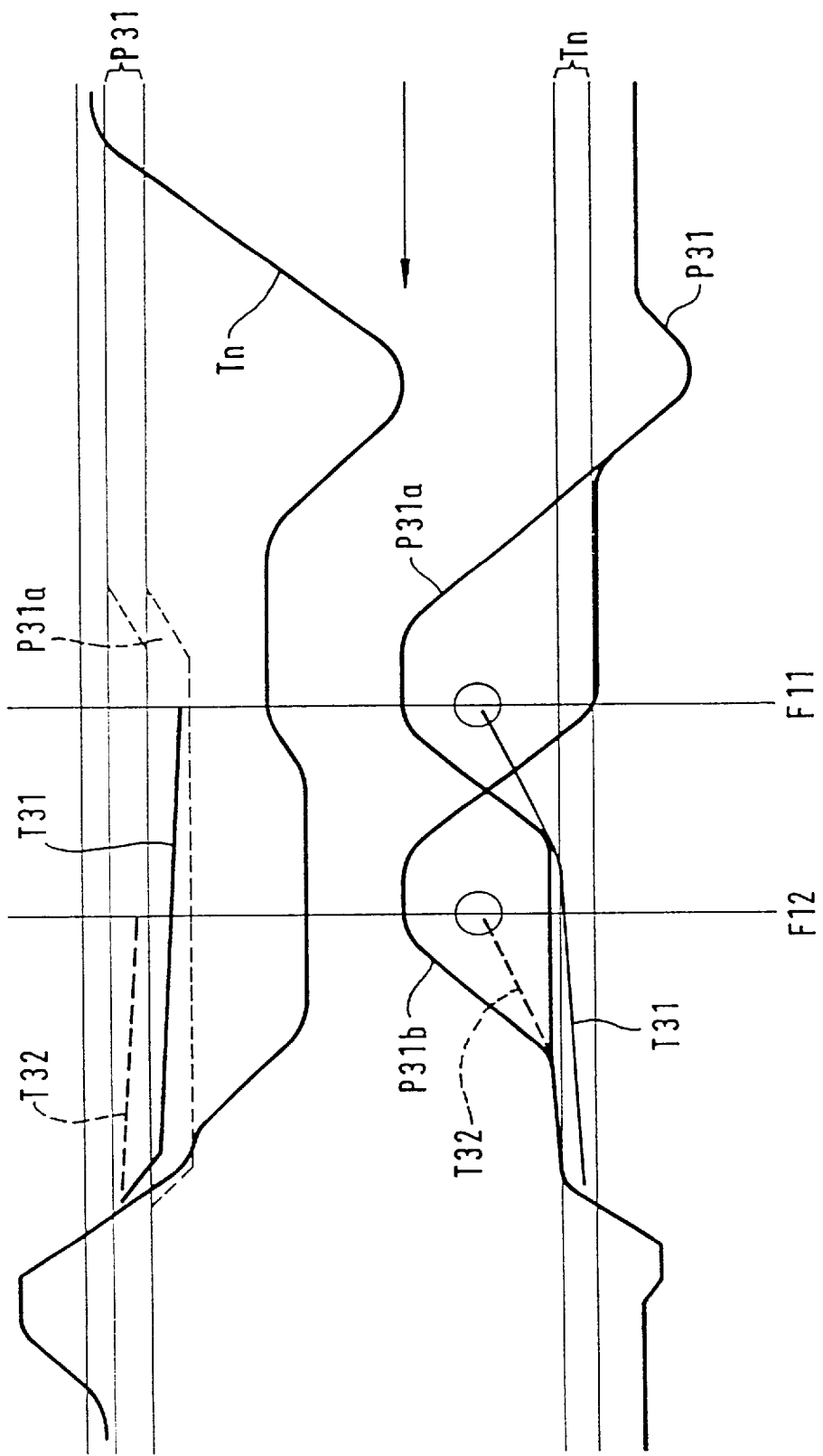
FIG. 54 is a diagram illustrating the tracks of needles and pile elements of FIG. 53 cooperating in knitting a complete course of a loop fabric.

An alternative to the foregoing described embodiment is illustrated in the arrangement of pile elements and intermediate jacks in FIG. 53 and their movements according to FIG. 54.

Adjacent a hooked portion 31h of the lower end of pile elements 31 a recess is formed in which a hooked portion 32h of an intermediate jack 32 is located. The neb 32n of the intermediate jack 32 is acting in an enlarged recess of the pile element 31, which can be actuated on butts 31b and pivoted by butts 31d when cooperating with a presser cam as described in the foregoing embodiment before.

The selective movements of the intermediate jacks 32 and pile elements are controlled from an arrangement according to FIG. 28b. The upright pile elements 31 are raised selectively from their intermediate jacks 32 into a feeding position (illustrated in FIG. 53 in dashed lines). If the pile elements 31p are pivoted by a presser cam acting on butts 31d prior to the retracting of the intermediate jacks, the protruding hooks 32h of the intermediate jacks will hook into the hook portion 31h of pile elements 31 which are then retracted in this disposition, as illustrated in FIG. 53 in full lines, by the intermediate jacks. FIG. 34 illustrates the movements of pile elements and needles for knitting a course of looped pile fabric with two pile yarns. Track Tn for the needles is identical with the needle movement in the foregoing embodiment. When the needles are raised to the clearing position the pile elements are retracted according track P31 for tensioning the previous knitted pile loops. Thereafter, they are raised to an idle position simultaneously with the retracting of the needles to a feeding position. Previously, the control jacks will have been reset and divided so that according to track P31a selected pile elements are raised to a feeding position. Simultaneously they are pivoted outward, so that at position F11 a first pile yarn T31 is fed to the pivoted pile elements 31p (FIG. 50). As described above the pile elements will remain in the pivoted position when they are retracted to an intermediate position without the support of 1 presser cam.

Figure 56:
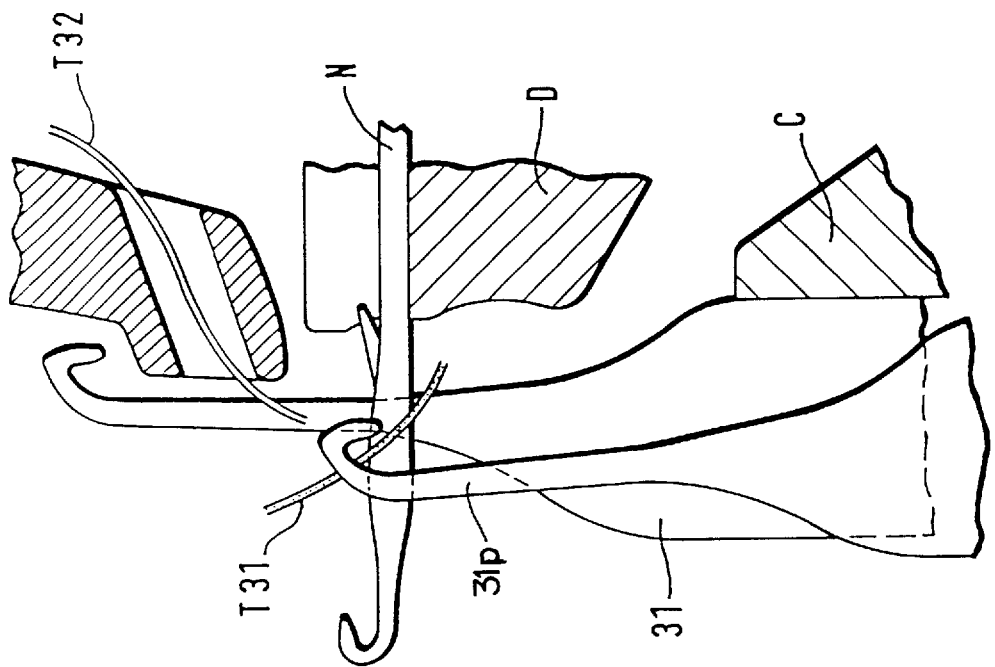
FIGS. 55 to 56 will illustrate the feeding positions of pile yarns according to the positions F11 and F12 in FIG. 54.
Figure 55:
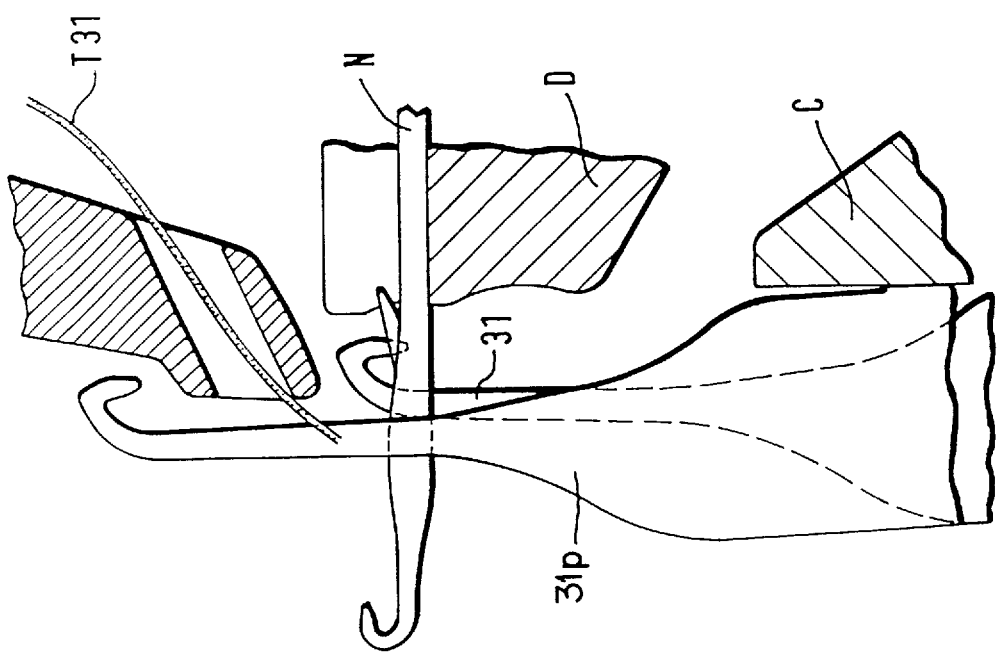

Prior to the retraction of the raised pile elements, the control jacks remaining in an idle position may additionally be divided so that all or a part of the cooperating pile elements are raised according to track 51b in FIG. 34. It is obvious from FIG. 55 that pile yarn T31 is shifted from the backs of the raising pile elements 31 into the hooks of the retracting pile elements 31p (FIG. 56).

When the pile elements 31, moved according to track 31b, are in feeding position a second pile yarn T32 is fed into the hooks of this pile elements in position F12 of FIG. 54. The raised pile elements will control the pile yarn T31 on their backs in the hooks of pile elements 31p (FIG. 56).

Thereafter, pile elements 31 are retracted to an intermediate position (analogous to FIG. 48) and the knitting and pile forming action is initiated as described in the foregoing embodiment (FIGS. 49 to 52). Thereby the pivoted position of pile elements 31p is nullified by an adequate raising of the intermediate jacks 32.

The manufacturing of loop structures from three pile yarns is performed when the both embodiments described before are joint together. This is illustrated in FIG. 57.

To realize a looped pile fabric with three pile yarns principally an arrangement of needles and pile elements as illustrated in FIG. 53 is provided wherein the pile elements 31 are pivotable into a medium and front position by an adequate arrangement of the fulcrum.

Figure 57:
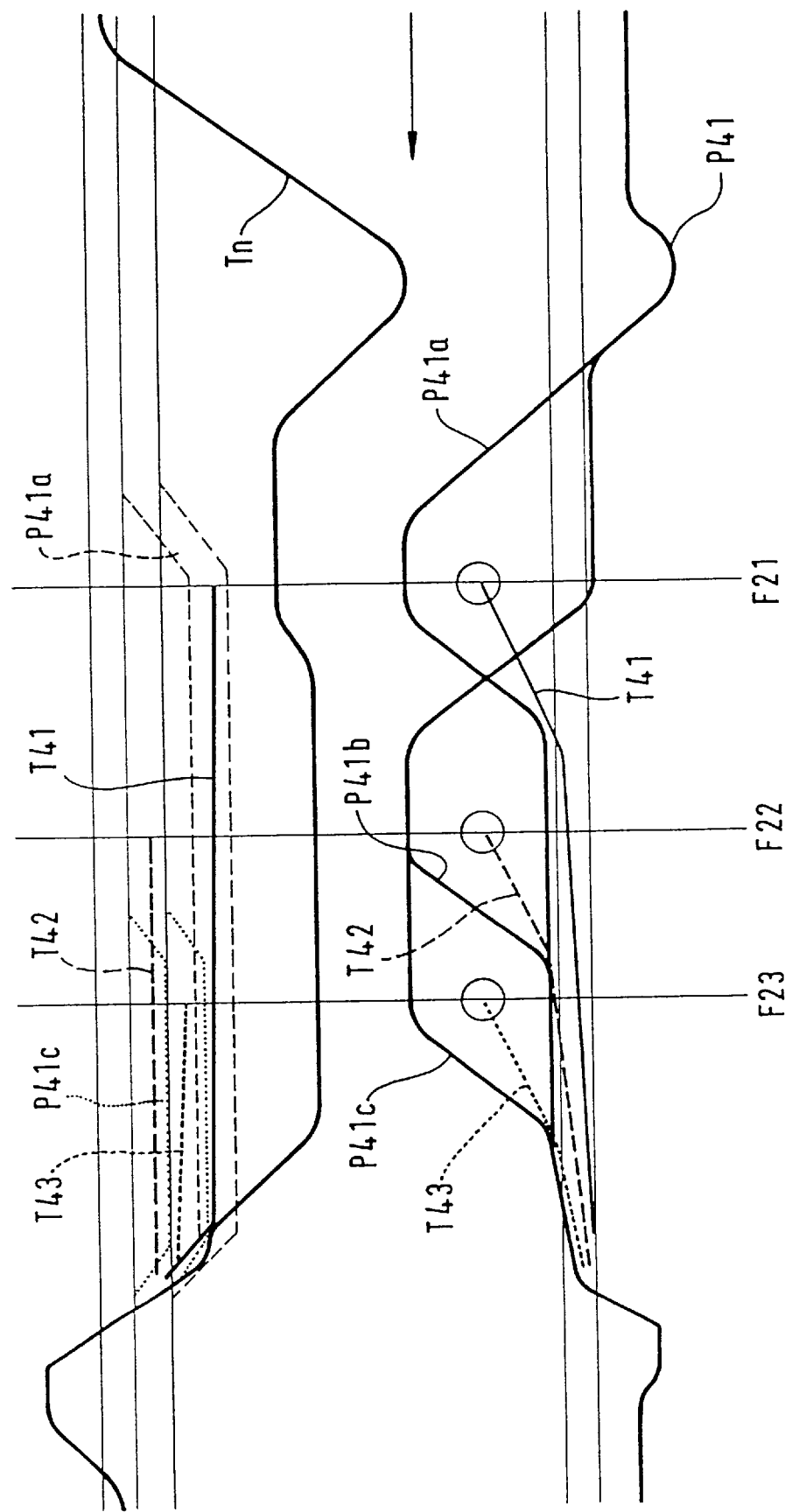
FIG. 57 is a diagram of the tracks of needles and pile elements for manufacturing a looped fabric from three pile yarns.

The knitting process as shown in FIG. 57 starts with the raising the needles according to track Tn into a clearing position in which the pile elements are cooperatively retracted to tension the previous knitted pile loops (track P41). Simultaneously, a selection is performed so that predetermined pile elements are raised and pivoted to a front position according to track P41a. At position F21 in FIG. 57 the first pile yarn T41 is fed to the relevant pile elements. Thereafter, the intermediate jacks are retracted so that they will hook into the pile elements (analogous to FIG. 53) and will position the cooperating pile elements with pile yarn T41 in an intermediate position.

Simultaneously, those pile elements remaining of an idle position are raised to a feeding position or a selected part of such pile elements if a dividing is desired. To these raised pile elements at position F22 in FIG. 57 the second pile yarn T42 is fed. A further selection will effect that only predetermined pile elements provided for looping the second pile yarn T42 are retracted with the pile yarn T42 to an intermediate position according to track P41b.

In the same time a presser cam acting on a presser butt of the pile elements remaining in feeding position will pivot or move these pile elements according to track P41c into a medium position in which the third pile yarn T43 is fed, as indicated at position F23 in FIG. 57. Subsequently, these pile elements are also retracted to an intermediate position and the looping and knitting action is initiated in the same way as described before.

It will be clearly seen from all the described embodiments set out herein that the highest capacity in manufacturing pile fabrics according to the present invention is obtained when all needles in the dial are uniformly actuated for knitting.

It will be obvious to those persons skilled in the art that divergent to the described embodiments the pile yarns can be also be engaged by predetermined needles, preferably alternating, for example analogous to relevant proposals referred in the introduction of the present application. As is generally known, it is necessary to arrange at least two groups of needles and to manipulate the groups of needles relative to one another according to a predetermined sequence.

If the pile yarns are knitted from predetermined (alternate) needles to stitches, the movement of the needles will be identical to the referred embodiments.

As also basically known an inlaid structure of the pile yarns is obtained by raising the engaging needles to the tuck position, which is identical with the feeding position in the embodiments. Therefore, in contrast to the embodiments the needles are raised to the tuck or feeding position and will remain meanwhile the process according to one of the embodiments is performed. Thereafter, an additional knitting process is required to knit a ground fabric at least from a ground yarn. If the bed supporting the needles is additionally equipped with sinkers (according to German Patent Publication No. 27 04 295) all needles can be raised to a clearing position and will knit a complete course, otherwise the alternative needles suspended from the previous pile forming process are raised and after knitting stitches the floats, overlapping the tuck stitches of the pile yarns, will prevent the pile yarns from moving subsequently with the raising of the needles.

With the exception of the embodiments in which the pile loops are severed in the knitting machine (FIGS. 6 to 43), in which the needles must be arranged in a dial and the pile elements in a cylinder, the arrangement of the needles and pile elements can be alternative in one of the two cooperating beds for knitting looped structures. If the needles are supported in a cylinder and the pile elements in the dial an additional adjustment of the pile length is enabled by alteration of the space between dial and cylinder.

An impression of such an arrangement is made by turning the drawings of FIGS. 44, 46 to 53 and 55, 56 clockwise for 90°.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for manufacturing a knitted looped pile fabric on a circular knitting machine having a circle of movable knitting needles and a circle of hooked pile elements movable transversely of and between the needles, said method comprising the steps:

a) raising the knitting needles to a feeding position and raising predetermined pile elements for pile forming into a feeding position;

b) feeding a first pile yarn to the pile elements in a feeding position and subsequently retracting selected pile elements with the first pile yarn into an intermediate position;

c) rocking the pile elements remaining in the feeding position outwardly from the dial and feeding a second pile yarn to such rocked pile elements;

d) retracting the pile elements engaging the second pile yarn to an intermediate position;

e) retracting the knitting needles and retracting the pile elements immediately when the needle hooks pass the hooks of the pile elements so that unengaged portions of the second pile yarn can pass such pile elements and simultaneously moving back pile elements waved outwardly; and f) retracting the needles to a knock over position and actuating the pile elements to a pile forming position.

2. A method for manufacturing a knitted looped pile fabric on a circular knitting machine having a circle of movable knitting needles in a dial and a circle of hooked pile elements movable transversely of and between said needles, said method comprising the steps:

a) raising knitting needles to a feeding position and raising pile elements selected to engage a first pile yarn into a feeding position;

b) rocking such pile elements outwardly from the dial and feeding a first pile yarn to such rocked pile elements;

c) retracting such pile elements to an intermediate position;

d) selecting pile elements and raising the selected pile elements to a feeding position and feeding a second pile yarn to such pile elements;

e) retracting such pile elements with the second pile yarn to an intermediate position;

f) retracting the knitting needles and retracting the pile elements immediately when the needle hooks pass the hooks of the pile elements, so that unengaged portions of the first pile yarn can pass overhead of the rocked pile elements; and g) retracting the needles into a knock over position and actuating the pile elements into a pile forming position.

3. The method for manufacturing a knitted looped pile fabric according to claim 1 or 2 wherein the pile elements are retracted for pile forming from the needles to a uniform position.

4. The method for manufacturing a knitted looped pile fabric according to claim 1 or 2 wherein the pile elements are retracted for pile forming from the needles to two different positions corresponding to their engagement of one of the pile yarns.

5. The method for manufacturing a knitted looped pile fabric according to claim 1 or 2 wherein the pile elements are selected for retraction into two different pile forming positions.

6. The method for manufacturing a knitted looped pile fabric according to claim 1 or 2 wherein the pile elements remain with their hooks in line with the needles for pile forming.

7. The method for manufacturing a knitted looped pile fabric according to claim 6 wherein the pile loops are rocked outwardly from the dial to a uniform pile forming position.

8. The method for manufacturing a knitted looped pile fabric according to claim 6, wherein a selected part of the pile elements are rocked outwardly from the dial to a second pile forming position.

9. A method for manufacturing a knitted looped pile fabric on a circular knitting machine having a circle of movable needles and a circle of hooked pile elements movable transversely of and between said needles, said method comprising the steps:

a) raising knitting needles to a feeding position and raising selected pile elements for engaging a first pile yarn into feeding position;

b) rocking the raised pile elements to an outermost position from the dial and feeding a first pile yarn to such rocked pile elements;

c) retracting the rocked pile elements together with a first pile yarn to an intermediate position and raising pile elements predetermined to engage a second and a third pile yarn into a feeding position;

d) feeding a second pile yarn to the pile elements positioned in a feeding position and retracting the selected pile elements together with the second pile yarn to an intermediate position;

e) rocketing the pile elements remaining in a feeding position into a medium horizontal position and feeding a third pile yarn to pile elements at such a medium horizontal position;

f) retracting the pile elements into an intermediate position together with the third pile yarn;

g) retracting the knitting needles and retracting the pile elements immediately when the needle hooks pass the hooks of the pile elements, so that unengaged portions of the first and third pile yarns will pass over the pile elements and simultaneously moving back the pile elements from their previously rocked positions; and h) retracting the knitting needles to a knock over position and actuating simultaneously the pile elements to a pile forming position.

10. The method for manufacturing a knitted looped pile fabric according to claim 9 wherein the pile elements are retracted into a uniform pile forming position.

11. The method for manufacturing a knitted looped pile fabric according to claim 9 wherein the pile elements are positioned with their hooks in line with the knitting needles for pile forming.

12. The method for manufacturing a knitted looped pile fabric according to claim 11 wherein the pile elements are rocked outwardly from the dial into a uniform pile forming position.

13. The method for manufacturing a knitted pile fabric according to one of claims 1,2 or 9 wherein all knitting needles are raised to a clearing position prior to their disposition in a feeding position.

14. The method for manufacturing a knitted pile fabric according to one of claims 1, 2 or 9 wherein alternate knitting needles are raised to a clearing position prior to their arrangement in a feeding position.

15. The method for manufacturing a knitted pile fabric according to claim 13, wherein the pile elements are retracted to a pile loop stretching position subsequent to the clearing of the loops from the latches of the knitting needles.

16. The method for manufacturing a knitted pile fabric according to one of claims 1, 2 or 9 wherein alternate needles are raised into a tuck position identical with the feeding position and subsequent to the pile forming action alternative needles are actuated for knitting a ground fabric from at least a ground yarn.

17. The method for manufacturing a knitted pile fabric according to claim 16 wherein all needles are raised for knitting a ground fabric.

18. The method for manufacturing a knitted pile fabric according to claim 16 wherein alternate needles are raised in predetermined sequence for knitting a ground fabric.

19. The method for manufacturing a knitted pile fabric according to claim 16 wherein the ground fabric contains pile forming yarns.

20. The method for manufacturing a knitted pile fabric according to claim 14 wherein the pile elements are retracted to a pile loop stretching position subsequent to the clearing of the loops from the latches of the knitting needles.

* * * * *